(12) United States Patent
Okazaki et al.

(10) Patent No.: US 7,116,618 B2
(45) Date of Patent: Oct. 3, 2006

(54) DEFECTIVE SECTOR DETERMINATION DEVICE AND OPTICAL DISK DRIVE

(75) Inventors: Makoto Okazaki, Niihama (JP); Yasushi Ueda, Saijo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/126,674

(22) Filed: May 11, 2005

(65) Prior Publication Data

US 2005/0226115 A1    Oct. 13, 2005

Related U.S. Application Data

(62) Division of application No. 10/049,207, filed as application No. PCT/JP01/04763 on Jun. 6, 2001, now Pat. No. 7,079,458.

(30) Foreign Application Priority Data

Jun. 8, 2000    (JP)    ............................. 2000-172540

(51) Int. Cl.
    *G11B 11/03*    (2006.01)
(52) U.S. Cl. ................................. 369/53.15; 369/47.14
(58) Field of Classification Search .................... None
    See application file for complete search history.

(56) References Cited

U.S. PATENT DOCUMENTS 5,793,724 A  *   8/1998   Ichikawa et al.   ........ 369/47.31

5,878,184 A        3/1999   Tajiri
6,137,756 A       10/2000   Yoshida et al.

FOREIGN PATENT DOCUMENTS

| JP | 04-141869  | 5/1992  |
|----|------------|---------|
| JP | 06-275032  | 9/1994  |
| JP | 08-111075  | 4/1996  |
| JP | 10-302402  | 11/1998 |
| JP | 11-96555   | 4/1999  |
| JP | 11-149705  | 6/1999  |
| JP | 11-162105  | 6/1999  |
| JP | 2000-40307 | 2/2000  |
| JP | 2000-112674| 4/2000  |

OTHER PUBLICATIONS

Japanese Search Report for PCT/JP2001/04763, dated Sep. 4, 2001, with English translation.

* cited by examiner

*Primary Examiner*—Paul W. Huber
(74) *Attorney, Agent, or Firm*—RatnerPrestia

(57) ABSTRACT

To provide an optical disk drive having an enhanced replaying capability in case of an abnormality occurring in various kinds of synchronization of the optical disk drive or in replay of a defective sector. A frame synchronization counter value address translation decoder, low order ID address translation decoder, adder/subtracter, high order ID address translation decoder, and adder are used to translate information read from an optical disk medium into an absolute storage address in a storage medium, and thus data that is highly replayed can be stored in the storage medium.

8 Claims, 11 Drawing Sheets

Fig. 8

| FRAME SYNCHRONIZATION CODE | FRAME SYNCHRONIZATION CODE SIGNAL |
|---|---|
| SY0 | 00000001b |
| SY1 | 00000010b |
| SY2 | 00000100b |
| SY3 | 00001000b |
| SY4 | 00010000b |
| SY5 | 00100000b |
| SY6 | 01000000b |
| SY7 | 10000000b |

Fig. 9(a)

| RELATIVE FRAME POSITION SIGNAL (Dec) | FRAME ADDRESS (Hex) |
|---|---|
| 0 | 000 |
| 1 | 080 |
| 2 | 100 |
| 3 | 180 |
| 4 | 200 |
| 5 | 280 |
| 6 | 300 |
| 7 | 380 |
| 8 | 400 |
| 9 | 480 |
| 10 | 500 |
| 11 | 580 |
| 12 | 600 |
| 13 | 680 |
| 14 | 700 |
| 15 | 780 |
| 16 | 800 |
| 17 | 880 |
| 18 | 900 |
| 19 | 980 |
| 20 | A00 |
| 21 | A80 |
| 22 | B00 |
| 23 | B80 |
| 24 | C00 |
| 25 | C80 |

Fig. 9(b)

| LOW ORDER FOUR BITS OF CURRENT ID INFORMATION SIGNAL (Dec) | SECTOR ADDRESS (Hex) |
|---|---|
| 0 | 0000 |
| 1 | 0D00 |
| 2 | 1A00 |
| 3 | 2700 |
| 4 | 3400 |
| 5 | 4100 |
| 6 | 4E00 |
| 7 | 5B00 |
| 8 | 6800 |
| 9 | 7500 |
| 10 | 8200 |
| 11 | 8F00 |
| 12 | 9C00 |
| 13 | A900 |
| 14 | B600 |
| 15 | C300 |

Fig. 9(c)

| RELATIVE ECC BLOCK ADDRESS (Dec) | ECC BLOCK ADDRESS (Hex) |
|---|---|
| 0 | 00000 |
| 1 | 0D000 |
| 2 | 1A000 |
| 3 | 27000 |
| 4 | 34000 |

Fig. 10(a)

| NTH SECTOR | N+1TH SECTOR | DEFECTIVE SECTOR | N+2TH SECTOR | N+3TH SECTOR | ... |

Fig. 10(b)

| NTH ECC BLOCK | N+1TH ECC BLOCK | DEFECTIVE SECTOR | N+3TH ECC BLOCK | N+4TH ECC BLOCK | ... |

DEFECTIVE SECTOR DETERMINATION DEVICE AND OPTICAL DISK DRIVE

This application is a divisional of U.S. patent application Ser. No. 10/049,207, filed Jun. 14, 2002 now U.S. Pat. No. 7,079,458, the contents of which are incorporated herein by reference, and which is a U.S. National Phase Application of PCT International Application PCT/JP2001/04763, filed Jun. 6, 2001.

THIS APPLICATION IS A U.S. NATIONAL PHASE APPLICATION OF PCT INTERNATIONAL APPLICATION PCT/JP01/04763.

TECHNICAL FIELD

The present invention relates to a buffer memory address translation device that generates a data storage address in a buffer memory used for an error correction processing of data read from an optical disk and data transfer to a host computer, a sector address reliability determination device that processes sector address information of data read from an optical disk, a defective sector determination device that determines a defective sector of an optical disk, an ECC block synchronization detection device that detects a synchronization of ECC blocks of data read from an optical disk, an optical disk drive, a medium, and an information aggregate.

BACKGROUND ART

In a conventional optical disk drive, as disclosed in Japanese Patent Laid-Open No. 10-302402 and Japanese Patent Laid-Open No. 11-162105, generation of a data storage address in a buffer memory that is storage means used for an error correction processing of data read from an optical disk and data transfer to a host computer is carried out in the following manner.

That is, detection and interpolation of various synchronization patterns indicating a beginning of data structure (ECC block synchronization, sector synchronization, frame synchronization) are carried out, and the data storage address in the buffer memory is controlled according to the various synchronization detection and interpolation signals.

That is, the address generation has been carried out in such a manner that the number of various synchronization detection and interpolation signals is reflected as is in the data storage address in the buffer memory.

Furthermore, in order to prevent an abnormality from occurring in the data storage address in the buffer memory, the detection and interpolation of the various synchronization signals have been enhanced.

In the case where such an optical disk drive is used that the number of the various synchronization detection and interpolation signals corresponds to the data storage address in the buffer memory as described above, there has been a problem that the correspondence between pieces of data stored in the buffer memory is lost before and after the abnormality in the synchronization signals by an abnormality occurring in the synchronization detection and interpolation signals, such as omission or error in detection, or failed interpolation, that is caused by factors such as a fingerprint or scratch on the optical disk medium.

That is, there is a problem (first problem) that when an abnormality is caused in the synchronization detection and interpolation signals by factors such as a fingerprint or scratch on the optical disk medium, the correspondence between pieces of data stored in the buffer memory is lost.

Furthermore, there has been a problem that if the correspondence between pieces of data stored in the buffer memory is lost by the above-described factors, the data read from the optical disk medium is difficult to be properly replayed even with error correcting means.

That is, there is a problem (second problem) that if the correspondence between pieces of data stored in the buffer memory is lost by the above-described factors, the data read from the optical disk medium is difficult to be properly replayed even with error correcting means.

In addition, there has been a problem that in case of the optical disk medium having defective sector information recorded therein, there has been a problem that it is difficult to read data from the optical disk medium unless the defective sector information is acquired from the optical disk medium and the defective sector is indicated.

That is, there is a problem (third problem) that in case of the optical disk medium having defective sector information recorded therein, there has been a problem that it is difficult to read data from the optical disk medium unless the defective sector information is acquired from the optical disk medium and the defective sector is indicated.

DISCLOSURE OF THE INVENTION

In view of the above-described first problem, the present invention aims to provide a buffer memory address translation device, a sector address information reliability determination device, a defective sector determination device, an ECC block synchronization detection device, an optical disk drive, a medium, and program with which the correspondence between pieces of data stored in the buffer memory is not lost even if an abnormality occurs in the synchronization detection and interpolation signals due to factors such as a fingerprint or scratch.

In view of the above-described second problem, the present invention aims to provide a buffer memory address translation device, a sector address information reliability determination device, a defective sector determination device, an ECC block synchronization detection device, an optical disk drive, a medium, and program with which the correspondence between pieces of data stored in the buffer memory is not lost.

In view of the above-described third problem, the present invention aims to provide a buffer memory address translation device, a sector address information reliability determination device, a defective sector determination device, an ECC block synchronization detection device, an optical disk drive, a medium, and program with which data can be read from the optical disk medium without the need for acquiring the defective sector information from the optical disk medium.

To solve the problems described above, one aspect of the present invention is a buffer memory address translation device, characterized in that the buffer memory address translation device comprises:

analysis means of analyzing a synchronization pattern included in data read from an optical disk medium and positional data allowing a data position to be recognized included in the data read from said optical disk medium; and address generation means of generating an address for storage into a buffer memory based on a result of said analysis, and said read data is stored in a region corresponding to said generated address in said buffer memory.

Another aspect of the present invention is the buffer memory address translation device, characterized in that said positional data is sector address information.

Still another aspect of the present invention is the buffer memory address translation device, characterized in that said positional data is a frame synchronization code.

Yet still another aspect of the present invention is the buffer memory address translation device, characterized in that said analysis means comprises:

sector address information readout means of reading sector address information included in the data read from said optical disk medium;

sector address information reliability determination means of determining the reliability of said read sector address information;

sector address information interpolation means of interpolating said sector address information for a sector the sector address information for which is not determined to be reliable; and sector address information selection means of selecting said sector address information read by said sector address information readout means or said sector address information interpolated by said sector address information interpolation means according to a predetermined criterion, and said address generation means generates an address for storage into said buffer memory according to said selected sector address information.

Still yet another aspect of the present invention is the buffer memory address translation device, characterized in that said read sector address information has an error detection code added thereto, and said determination of reliability is accomplished by using said added error detection code to detect an error in said read sector address information.

A further aspect of the present invention is the buffer memory address translation device, characterized in that said determination of reliability is accomplished by determining continuity between said read sector address information and sector address information previously read.

A still further aspect of the present invention is the buffer memory address translation device, characterized in that said predetermined criterion is a criterion of reliability required by external control means, and said sector address information selection means selects one of them by analyzing the criterion of reliability required by said external control means and said determination result of said sector address information reliability determination means.

A yet further aspect of the present invention is a buffer memory address translation device, characterized in that the buffer memory address translation device comprises:

readout means of reading a frame synchronization code added to data read from an optical disk medium;

storage means of encoding said read frame synchronization codes and sequentially storing the same therein;

frame position digitization means of digitizing a position of a frame based on an arrangement of said codes stored in said storage means;

continuity determination means of determining whether said digitized frame positions are continuous;

counter means of counting the number of the digitized frame positions that are determined to be continuous;

frame position determination means of comparing the number of the continuous frame positions counted by said counter means with a threshold that can be set by an external control means and, if the result of said comparison satisfies a predetermined condition, determining that the value digitized by said frame position digitization means is a frame position;

frame position interpolation means of, if the condition is not satisfied in said frame position determination means, carrying out interpolation based on a previous frame position for which the condition is satisfied to find a frame position; and address generation means of generating an address for storage into a buffer memory based on said frame position found by said frame position interpolation means or the frame position determined by said frame position determination means, and said read data is stored in a region corresponding to said generated address in said buffer memory.

A still yet further aspect of the present invention is a sector address information reliability determination device, characterized in that the sector address information reliability determination device comprises:

error detection means of detecting an error of sector address information included in data read from an optical disk medium and having an error detection code added thereto;

sector address information continuity determination means of comparing said sector address information currently extracted from said read data with said sector address information previously extracted to determine the continuity of said sector address information; and reliability determination means of determining the reliability of said sector address information based on the result of the error detection for said sector address information and the result of the continuity determination for said sector address information with reference to a predetermined condition set by said external control means.

An additional aspect of the present invention is a defective sector determination device, characterized in that the defective sector determination device comprises:

continuity detection means of detecting a position where a difference occurs between the continuity of said sector physical address information and the continuity of said sector logical address information;

defective sector detection means of finding a defective sector using said detected difference; and informing means of informing an external control means of said detected defective sector, in readout from a rewritable optical disk medium storing sector physical address information that is a physical address of said sector besides sector logical address information included in data.

A still additional aspect of the present invention is the defective sector determination device, characterized in that said defective sector detection means detects the number of said defective sectors and the sector physical address information of a leading one of said defective sectors, and said informing means informs of said number of defective sectors and said sector physical address information of a leading one of said defective sectors.

A yet additional aspect of the present invention is the defective sector determination device, characterized in that said continuity determination means comprises:

sector physical address information readout means of reading said sector physical address information;

sector physical address information error detection means of detecting an error of said read sector physical address information; and sector physical address information comparison means of comparing, of the sector physical address information for which an error is not detected by said sector physical address information error detection means, current sector physical address information with the previous sector physical address information, and said continuity determination means of, if said sector physical address information error detection means detects no error in said read sector physical address information, determining the continuity between said read sector physical address information and said previous sector physical address information based on the result of said comparison.

A still yet additional aspect of the present invention is the defective sector determination device, characterized in that said continuity determination means comprises:

sector logical address information readout means of reading said sector logical address information;

sector logical address information error detection means of detecting an error of said read sector logical address information; and sector logical address information comparison means of comparing, of the sector logical address information for which an error is not detected by said sector logical address information error detection means, current sector logical address information with the previous sector logical address information, and said continuity determination means of, if said sector logical address information error detection means detects no error in said read sector logical address information, determining the continuity between said read sector logical address information and said previous sector logical address information based on the result of said comparison.

A supplementary aspect of the present invention is the defective sector determination device, characterized in that said position where a difference occurs is a position where there are one or more sectors for which the sector physical address information is determined to be continuous between two continuous sectors corresponding to the sector address information for which said sector address information is determined to be continuous.

A still supplementary aspect of the present invention is the defective sector determination device, characterized in that said defective sector detection means regards the sector physical address information of the sector for which said sector logical address information is not continuous as the sector physical address information of said leading one of the defective sectors.

A yet supplementary aspect of the present invention is the defective sector determination device, characterized in that said defective sector detection means detects the number of sectors for which said sector physical address information is determined to be continuous and that exist between the two sectors corresponding to the sector logical address information determined to be continuous, and regards said number of detected sectors as said number of defective sectors.

A still yet supplementary aspect of the present invention is an ECC block synchronization detection device, characterized in that the ECC block synchronization device comprises:

error detection means of detecting an error of sector address information that is read from an optical disk medium in which an error correcting code is added thereto across n sectors (n=integer) and the error correcting code is accommodated in the continuous n sectors;

sector address information division means of, if said error detection means detects no error in said read sector address information, finding the quotient of said read sector address information divided by the number of sectors constituting an ECC block; and ECC block detection means of, if said sector address information error detection means detects no error in said read sector address information, comparing said quotient of said read sector address information with the previously found quotient and determining that the ECC block synchronization is detected if the comparison does not result in a match.

Another aspect of the present invention is an optical disk drive, characterized in that the optical disk drive comprises:

data readout means of reading data from an optical disk medium; and a controller that, in response to a request from an external device, controls said data readout means to temporarily store said read data into a buffer memory and then transfers the same to said external device, and said controller has the buffer address translation device, sector address reliability determination device, defective sector determination device, or ECC block synchronization detection device.

Still another aspect of the present invention is a medium capable of being processed by a computer, characterized in that the medium stores a program for making the computer serve as whole or part of the analysis means of analyzing a synchronization pattern included in data read from an optical disk medium and positional data allowing a data position to be recognized included in the data read from said optical disk medium, and the address generation means of generating an address for storage into a buffer memory based on a result of said analysis of the buffer memory address translation device.

Yet still another aspect of the present invention is a medium capable of being processed by a computer, characterized in that the medium stores a program for making the computer serve as whole or part of the readout means of reading a frame synchronization code added to data read from an optical disk medium, the storage means of encoding said read frame synchronization codes and sequentially storing the same therein, the frame position digitization means of digitizing a position of a frame based on an arrangement of said codes stored in said storage means, the continuity determination means of determining whether said digitized frame positions are continuous, the counter means of counting the number of the digitized frame positions that are determined to be continuous, the frame position determination means of comparing the number of the continuous frame positions counted by said counter means with a threshold that can be set by an external control means and, if the result of said comparison satisfies a predetermined condition, determining that the value digitized by said frame position digitization means is a frame position, the frame position interpolation means of, if the condition is not satisfied in said frame position determination means, carrying out interpolation based on a previous frame position for which the condition is satisfied to find a frame position, and the address generation means of generating an address for storage into a buffer memory based on said frame position found by said frame position interpolation means or the frame position determined by said frame position determination means of the buffer memory address translation device.

Still yet another aspect of the present invention is a medium capable of being processed by a computer, characterized in that the medium stores a program for making the computer serve as whole or part of the error detection means of detecting an error of sector address information included in data read from an optical disk medium and having an error detection code added thereto, the sector address information continuity determination means of comparing said sector address information currently extracted from said read data with said sector address information previously extracted to determine the continuity of said sector address information, and the reliability determination means of determining the reliability of said sector address information based on the result of the error detection for said sector address information and the result of the continuity determination for said sector address information with reference to a predetermined condition set by said external control means of the sector address information reliability determination device.

A further aspect of the present invention is a medium capable of being processed by a computer, characterized in that the medium stores a program for making the computer serve as whole or part of the continuity detection means of detecting a position where a difference occurs between the continuity of said sector physical address information and the continuity of said sector logical address information, the defective sector detection means of finding a defective sector using said detected difference, and the informing means of informing an external control means of said detected defective sector of the defective sector determination device according to the 10th invention in readout from a rewritable optical disk medium storing said sector physical address information that is a physical address of said sector besides said sector logical address information included in data.

A still further aspect of the present invention is a medium capable of being processed by a computer, characterized in that the medium storing a program for making the computer serve as whole or part of the error detection means of detecting an error of sector address information that is read from an optical disk medium and has an error correcting code added thereto across n sectors (n=integer) and the error correcting code accommodated in the continuous n sectors, the sector address information division means of, if said error detection means detects no error in said read sector address information, finding the quotient of said read sector address information divided by the number of sectors constituting an ECC block, and the ECC block detection means of, if said sector address information error detection means detects no error in said read sector address information, comparing said quotient of said read sector address information with the previously found quotient and determining that the ECC block synchronization is detected if the comparison does not result in a match of the ECC block synchronization detection device.

A yet further aspect of the present invention is a program for making the computer serve as whole or part of the analysis means of analyzing a synchronization pattern included in data read from an optical disk medium and positional data allowing a data position to be recognized included in the data read from said optical disk medium, and the address generation means of generating an address for storage into a buffer memory based on a result of said analysis of the buffer memory address translation device according to the 1st invention.

A still yet further aspect of the present invention is a program for making the computer serve as whole or part of the readout means of reading a frame synchronization code added to data read from an optical disk medium, the storage means of encoding said read frame synchronization codes and sequentially storing the same therein, the frame position digitization means of digitizing a position of a frame based on an arrangement of said codes stored in said storage means, the continuity determination means of determining whether said digitized frame positions are continuous, the counter means of counting the number of the digitized frame positions that are determined to be continuous, the frame position determination means of comparing the number of the continuous frame positions counted by said counter means with a threshold that can be set by an external control means and, if the result of said comparison satisfies a predetermined condition, determining that the value digitized by said frame position digitization means is a frame position, the frame position interpolation means of, if the condition is not satisfied in said frame position determination means, carrying out interpolation based on a previous frame position for which the condition is satisfied to find a frame position, and the address generation means of generating an address for storage into a buffer memory based on said frame position found by said frame position interpolation means or the frame position determined by said frame position determination means of the buffer memory address translation device.

An additional aspect of the present invention is a program for making the computer serve as whole or part of the error detection means of detecting an error of sector address information included in data read from an optical disk medium and having an error detection code added thereto, the sector address information continuity determination means of comparing said sector address information currently extracted from said read data with said sector address information previously extracted to determine the continuity of said sector address information, and the reliability determination means of determining the reliability of said sector address information based on the result of the error detection for said sector address information and the result of the continuity determination for said sector address information with reference to a predetermined condition set by said external control means of the sector address information reliability determination device.

A still additional aspect of the present invention is a program for making the computer serve as whole or part of the continuity detection means of detecting a position where a difference occurs between the continuity of said sector physical address information and the continuity of said sector logical address information, the defective sector detection means of finding a defective sector using said detected difference, and the informing means of informing an external control means of said detected defective sector of the defective sector determination device in readout from a rewritable optical disk medium storing said sector physical address information that is a physical address of said sector besides said sector logical address information included in data.

A yet additional aspect of the present invention is a program for making the computer serve as whole or part of the error detection means of detecting an error of sector address information that is read from an optical disk medium and has an error correcting code added thereto across n sectors (n=integer) and the error correcting code accommodated in the continuous n sectors, the sector address information division means of, if said error detection means detects no error in said read sector address information, finding the quotient of said read sector address information divided by the number of sectors constituting an ECC block, and the ECC block detection means of, if said sector address information error detection means detects no error in said read sector address information, comparing said quotient of said read sector address information with the previously found quotient and determining that the ECC block synchronization is detected if the comparison does not result in a match of the ECC block synchronization detection device.

Now, an operation of the present invention will be described.

The optical disk drive according to the present invention is characterized in that a synchronization pattern and data enabling recognition of a data position included in the data read from an optical disk medium are analyzed, and the data read from the optical disk medium is accurately stored in a buffer memory.

According to the present invention, even if an abnormality in the various synchronization detection and interpolation signals is caused by factors such as a fingerprint or scratch on the optical disk medium, an accurate data storage address in the buffer memory can be generated, and when data is to be read from the optical disk medium having defective sector information recorded therein, a reliable data storage address in the buffer memory can be generated without the need for acquiring the defective sector information before reading the data from the optical disk medium.

BRIEF DESCRIPTION OF THE DRAWINGS

FIG. 8 is a table showing a correspondence between a frame synchronization code and a frame synchronization signal according to the first embodiment of the present invention;

FIG. 9(a) is a table showing a correspondence of a decoded address value with a frame according to the first embodiment of the present invention;

FIG. 9(b) is a table showing a correspondence of a decoded address value with a sector according to the first embodiment of the present invention;

FIG. 9(c) is a table showing a correspondence of a decoded address value with an ECC block according to the first embodiment of the present invention;

FIG. 10(a) shows a sector structure of a disk that is written according to a defect management method of skipping only a defective sector according to a second embodiment of the present invention;

FIG. 10(b) shows a structure of ECC blocks that is written according to a defect sector management method of skipping an ECC block including a defective sector according to the second embodiment of the present invention.

DESCRIPTION OF SYMBOLS

Figure 1:
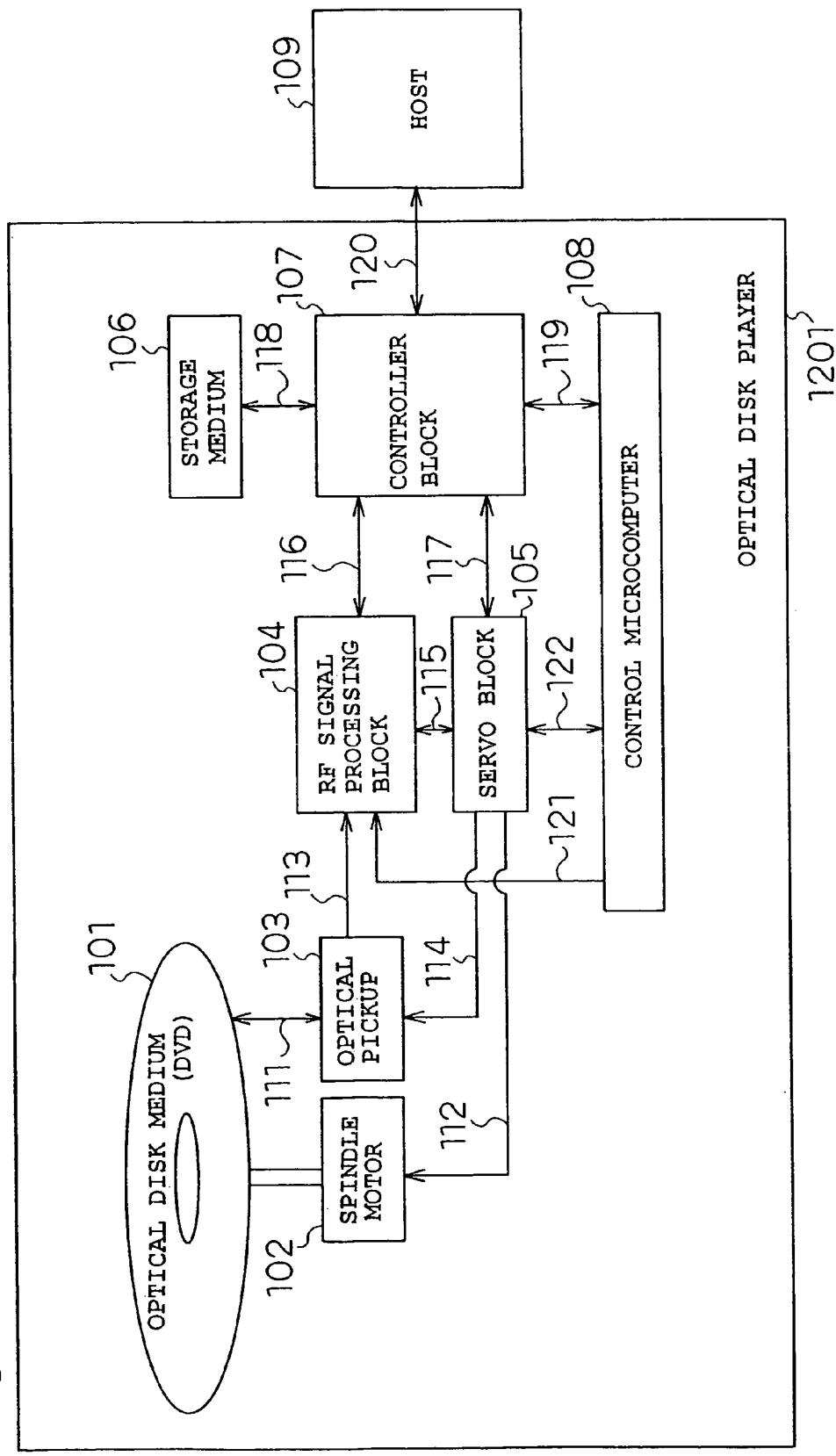
FIG. 1 is a block diagram showing an optical disk drive according to a first embodiment of the present invention.

101 Optical disk (DVD)
102 Spindle motor
103 Optical pickup
104 RF signal processing block
105 Servo block
106 Buffer memory
107 Controller block
108 Control microcomputer
109 Host
111 Irradiation light and reflected light
112 Spindle motor control signal
113 RF signal
114 Optical pickup control signal
115 Signal between RF signal processing block and servo block
116 Signal between RF signal processing block and controller block
117 Signal between servo block and controller block
118 Signal between buffer memory and controller block
119 Signal between control microcomputer and controller block
120 Signal between host and controller block
121 Signal between control microcomputer and RF signal processing block
122 Signal between control microcomputer and servo block
201 Byte counter
202 Frame synchronization counter value address translation decoder
203 Low order ID address translation decoder
204 Adder/subtracter
205 High order ID bit address translation decoder
206 Adder
211 ID information corresponding to data requested by host 109
212 Positional information on start of storage into buffer memory 106
213 In-frame address
214 ECC block positional information
215 Buffer memory storage address
301 Channel data parallelization block
302 Frame synchronization signal generation block
303 Frame synchronization code encoding block
304 Data demodulation block
305 Sector synchronization detection block
306 Sector synchronization interpolation block
307 Frame synchronization counter block
308 Frame position detection block
309 Sector synchronization signal generation block
310 Frame position reliability determination block
311 Frame synchronization counter value address translation block
321 Channel data
322 Parallel data 323 Frame synchronization signal
324 Frame synchronization code signal
325 Sector synchronization signal
326 Sector synchronization interpolation signal
327 Absolute frame position signal
328 Frame position detection result adoption signal
329 Frame position signal
330 Frame synchronization code arrangement OK signal
331 Sector synchronization signal
332 Frame address
333 Demodulated data
334 Byte clock
401 ID regeneration block
402 ECC block synchronization detection block
403 ECC block synchronization interpolation block
404 Sector synchronization counter block
405 ID reliability determination block
406 ECC block synchronization signal generation block
407 ID information address translation block
411 ID acquisition signal
412 ECC block synchronization detection signal
413 ECC block synchronization interpolation signal
414 Absolute sector address signal
415 Address reliability OK signal
416 High order address determination result signal
417 Current ID information signal
418 ECC block synchronization signal
419 Sector address
420 ECC block address
501 Frame synchronization code encoding register A
502 Frame synchronization code encoding register B
503 Frame position detection decoder
505 Frame synchronization code arrangement OK counter
506 Frame position detection result adoption determination circuit
511 (n−1)th frame synchronization code signal
512 (n−2)th frame synchronization code signal
513 Frame position determination condition
521 Frame synchronization code arrangement OK count signal
601 Address comparator A
602 Address comparator B
603 Address reliability condition determination decoder
604 Selector
605 Incrementer
606 ID retaining register
611 Address component of ID information of ID acquisition signal 411
612 Error detection result component of ID information of ID acquisition signal 411
613 Address reliability determination condition
614 Address continuity determination signal
618 Address expected value signal
619 Current address selection signal
1101 Physical ID retaining register A
1102 Physical ID retaining register B
1103 Incrementer A
1104 Subtracter
1105 ID retaining register
1106 Incrementer B
1107 Comparator
1108 Defective sector detector
1111 ID regeneration signal
1112 Physical ID signal
1113 Physical ID acquisition signal
1114 Physical ID signal
1115 Physical ID expected value signal
1116 Number of defective sectors
1117 ID signal
1118 ID expected value signal
1119 ID continuity signal
1120 Defective sector detection signal

BEST MODE FOR CARRYING OUT THE INVENTION

As an example of the present invention, an optical disk drive is characterized in that an address used for accurately storing data read from an optical disk medium into a buffer memory is generated and that even if an abnormality occurs in various kinds of synchronization indicating a beginning of a data unit due to various factors such as a fingerprint or scratch on the optical disk medium, the address used for accurately storing the data read from the optical disk medium into the buffer memory can be generated by analyzing the data read from the optical disk medium and grasping a positional relationship between the data read from the optical disk medium and data previously stored in the buffer memory.

As an example of the present invention, an optical disk drive is characterized in that means of analyzing the data read from the optical disk medium is to analyze the sector identification information read from the optical disk medium.

As an example of the present invention, the optical disk drive is characterized in that the means of analyzing the data read from the optical disk medium is to analyze the frame synchronization code read from the optical disk medium.

As an example of the present invention, the buffer memory address translation device comprises means of reading sector address information added to the data read from the optical disk medium, means of determining the reliability of the sector address information read by the above means, means of interpolating the sector address information for a sector the sector address information for which is not determined to be reliable, means of selecting the information generated by the above means of reading sector address information or the information interpolated by the above means of interpolating the sector address information, and means of generating an address for storage in the buffer memory based on the above selected information, and can accurately generate an address for storage of the data read from the optical disk medium into the buffer memory by generating the address for storage into the buffer memory using a reliable sector address information even if an abnormality occurs in various kinds of synchronization indicating a beginning of a data unit due to various factors such as a fingerprint or scratch on the optical disk medium.

As an example of the present invention, the means of determining the reliability of the sector address information of the buffer memory address translation device for sector address information is characterized in that it detects an error in the sector address information by using an error detection code added to the sector address information.

As an example of the present invention, the means of determining the reliability of the sector address information of the buffer memory address translation device for sector address information is characterized in that it determines continuity of the address information when the current sector address information coincides with the value of the previous sector address information plus 1.

As an example of the present invention, the means of selecting the information generated by the means of reading the sector address information or the information generated by the means of interpolating the sector address of the buffer memory address translation device for sector address information is characterized in that it analyzes the condition of reliability for the sector address information required by the external control means and the result of reliability determination for the sector information to determine the sector address information to be selected.

As an example of the present invention, the sector address information reliability determination device comprises means of detecting an error of sector address information read from the optical disk medium, means of determining the continuity of the sector address information based on the result of the comparison between the currently read sector address information and previously read sector address information and the condition set by the external control means, and means of determining the continuity of the sector address information in cooperation with the means of detecting an error of sector address information with reference to the condition set by the external control means, and, even if there is an error in the sector address information due to various factors such as a fingerprint or scratch on the optical disk medium, can determine the reliability of the sector address information by checking that the result of the error detection for the sector address information and the continuity of the sector address information satisfy the condition set by the external control means.

As an example of the present invention, in readout from a rewritable optical disk medium storing physical sector address information added to a physical sector besides the sector address information added to data, a defective sector determination device comprises means of detecting a position where a difference occurs between the continuity of the physical sector address information and the continuity of the sector address information, means of storing the physical sector address information for which a difference occurs between the continuity of the physical sector address information and the continuity of the sector address information, means of detecting the number of physical sectors existing between the continuous pieces of sector address information, and means of informing the external control means of the detection and storage, and can determine the defective sector by checking the difference between the sector address information and the physical sector address information even when the defective sector information is not previously acquired in the optical disk medium having the defective sector information recorded therein.

As an example of the present invention, the defective sector determination device is characterized in that it comprises means of reading the physical sector address information, means of detecting an error in the physical sector address information read by the above means, means of storing the previous physical sector address information of the physical sector address information that is determined to be reliable by the means of detecting an error in the physical sector address information, and means of comparing the stored previous physical sector address information with the current physical sector address information, and determines the continuity of the physical sector address that is determined to be reliable by the means of detecting an error in the physical sector address information.

As an example of the present invention, the defective sector determination device is characterized in that it comprises means of reading the sector address information, means of detecting an error in the sector address information read by the above means, means of storing the previous sector address information of the sector address information that is determined to be reliable by the means of detecting an error in the sector address information, and means of comparing the stored previous sector address information with the current sector address information, and determines the continuity of the sector address that is determined to be reliable by the means of detecting an error in the sector address information.

As an example of the present invention, the means of detecting a position where a difference occurs between the continuity of the physical sector address information and the continuity of the sector address information is characterized in that it detects that there are a plurality of physical sectors for which the physical sector address information is determined to be continuous between two continuous sectors for which the sector address information is determined to be continuous, and detects the physical sector having no user data recorded therein.

As an example of the present invention, the means of storing the physical sector address information for which a difference occurs between the continuity of the physical sector address information and the continuity of the sector address information is characterized in that it stores the physical sector address information of the physical sector for which the sector address information of the present invention is not continuous.

As an example of the present invention, the means of detecting the number of physical sectors existing between the continues pieces of sector address information is characterized in that it recognizes the number of physical sectors for which the physical sector address information is determined to be continuous and that exist between the two continuous sectors for which the sector address information is determined to be continuous.

As an example of the present invention, the ECC block synchronization detection device comprises means of detecting an error of sector address information that is read from an optical disk medium in which an error correcting code is added thereto across n sectors (n=integer) and the error correcting code is accommodated in the continuous n sectors, means of, if the error detection means detects no error in the sector address information, finding the quotient of "(the read sector address information)/(the number of sectors constituting an ECC block)", means of storing the quotient of the sector address information found by the above means, and means of, if the means of detecting an error of sector address information detects no error in the current sector address information, comparing the quotient of the sector address information stored in the above means with the current quotient and determining that the ECC block synchronization is detected if the comparison does not result in a match, and even if the ECC block synchronization is lost by various factors such as fingerprint or scratch on the optical disk medium, loss of data can be reduced by using the quotient of "(the read sector address information)/(the number of sectors constituting an ECC block)" to detect the ECC block synchronization.

As an example of the present invention, the buffer memory address translation device comprises means of reading a frame synchronization code added to data read from the optical disk medium, storage means of encoding the frame synchronization codes read by the above means and sequentially storing the same, the number of codes stored in the storage means being capable of being set by an external control means, means of digitizing a frame position based on the arrangement of the codes stored in the storage means, means of determining whether the values obtained by digitizing the frame positions by the above means are continuous, means of counting the number of the frame positions determined to be continuous by the above means, means of comparing the number of the continuous frame positions counted by the above means with a threshold that can be set by the external control means and if the comparison result satisfies a condition, determining that the value obtained by digitizing the frame position by the above means to be the frame position, and if the comparison result does not satisfy the condition, performing interpolation based on a previous frame position for which the condition is satisfied and regarding the interpolated frame-position as the frame position, and means of generating an address for storage into the buffer memory according to the frame position determined by the above means, and even if the frame synchronization is lost by various factors such as a fingerprint or scratch on the optical disk medium, loss of data can be reduced by using the frame synchronization code to recognize the frame position of the data read from the disk.

Embodiments of the present invention will be described below with reference to the drawings.

(First Embodiment)

First, a first embodiment will be described with reference to FIGS. 1, 2, 3, 4, 5, 6, 7, 8, 9, and 10.

FIG. 1 shows a structure of an optical disk drive 1201 of this embodiment.

In FIG. 1, reference numeral 101 denotes an optical disk medium having information recorded therein, reference numeral 102 denotes a spindle motor for rotating the optical disk medium, reference numeral 103 denotes an optical pickup that irradiates the optical disk medium with laser light and converts the intensity of the light reflected therefrom into voltage, reference numeral 104 denotes an RF signal processing block that converts the signal converted into voltage by the optical pickup 103 into a binary signal and generates a clock synchronized with the binary signal, reference numeral 105 denotes a servo block for controlling the rotation of the spindle motor 102 and position of the optical pickup 103, reference numeral 106 denotes a buffer memory for retaining various kinds of information, reference numeral 107 denotes a controller block for carrying out storage of the binary signal generated in the RF signal processing block 104 into the storage medium (hereinafter referred to as buffer memory) 106, error correction processing thereof, data transfer to/from a host 109, interpretation of an instruction from a control microcomputer 108 or the like, reference numeral 108 denotes the control microcomputer for controlling the RF signal processing block 104, servo block 105, and controller block 107, and reference numeral 109 denotes a host that issues a replay request for data of the optical disk medium 101 or the like. These components 102, 103, 104, 105, 106, 107, and 108 constitute the optical disk drive, and constitute means capable of servicing a replay request of the optical disk medium 101 issued by the host 109.

Now, an operation of the optical disk drive when the replay request of the optical disk medium 101 is issued by the host 109 will be described.

First, the host 109 requests a position and quantity of data to be replayed of the optical disk medium 101 from the controller block 107. Upon receiving the request from the host 109, the controller block 107 informs the control microcomputer 108 of the details of the request from the host 109. The control microcomputer 108 analyzes the request from the host 109, issues to the servo block 105 an instruction for controlling the rotation of the optical disk medium 101 and moving the optical pickup 103 to the vicinity of a position where the data the host 109 requests for the replay thereof is recorded, and instructs the controller block 107 to transfer the data the host 109 requests for the replay thereof to the host 109.

Upon receiving the instruction from the control microcomputer 108, the servo block 105 follows the instruction to allow the spindle motor 102 to be rotated at a predetermined speed and the optical pickup 103 to be moved.

The optical disk medium 101 is rotated by the spindle motor 102. The optical disk medium 101 has information recorded therein by having pits formed in tracks thereof.

The optical pickup 103 moved by the servo block 105 irradiates the rotating optical disk medium 101 with light and receives the light reflected by the optical disk medium 101. In this regard, the light reflected by the optical disk medium 101 varies in intensity under the influence of the pits formed on the optical disk medium 101. Upon receiving the reflected light, the optical pickup 103 outputs an RF signal 113 obtained by converting the intensity of the reflected light into voltage to the RF signal processing block 104 and outputs information on the shape and position of the reflected light to the servo block 105.

Upon receiving the information on the shape and position of the reflected light, the servo block 105 detects a focal point of the light applied to the optical disk medium 101 and a track position where the data is recorded of the optical disk medium 101, and moves the optical pickup 103 vertically and horizontally to adjust the position thereof to a position where data can be read from the optical disk medium 101.

Upon receiving the RF signal 113 from the optical pickup 103, the RF signal processing block 104 converts the signal into a binary signal, generates a clock synchronized with the binary signal, and outputs it to the controller block 107. Hereinafter, the binary signal is referred to as channel data, and the clock synchronized with the binary signal is referred to as a channel clock.

Upon receiving the channel data and channel clock from the RF signal processing block 104, the controller block 107 samples the channel data on the channel clock, converts the channel data into a predetermined format, and acquires address information from the converted data. Upon acquiring the address information, the controller block 107 provides the acquired address information for the control microcomputer 108, and follows the instruction from the controller microcomputer to store the data converted into the predetermined format into the buffer memory 106. Furthermore, the controller block 107 performs the error correction processing and error detection processing on the data stored in the buffer memory 106, informs the control microcomputer 108 of the results, and follows the instruction from the control microcomputer 108 to transfer the data stored in the buffer memory 106 to the host 109.

Upon receiving the address information and the results of the error correction processing and error detection processing from the controller block 107, the control microcomputer 108 analyzes the received information and instructs the servo block 105 and controller block 107 to repeat the above process a certain number of times until the controller block 107 transfers the data requested by the host 109 to the host 109. In the case where the data cannot be transferred to the host even though the above process has been repeated the certain number of times, the control microcomputer 108 notifies the host 109 via the controller block 107 of the reason why the requested data cannot be transferred.

Next, for the case where the optical disk medium 101 is a DVD, an operation of the controller block 107 converting the channel data received from the RF signal processing block 104 into a structure shown in FIG. 7 to store it into the buffer memory 106 will be described. In the following description, the optical disk medium 101 is referred to as DVD 101.

Figure 7:
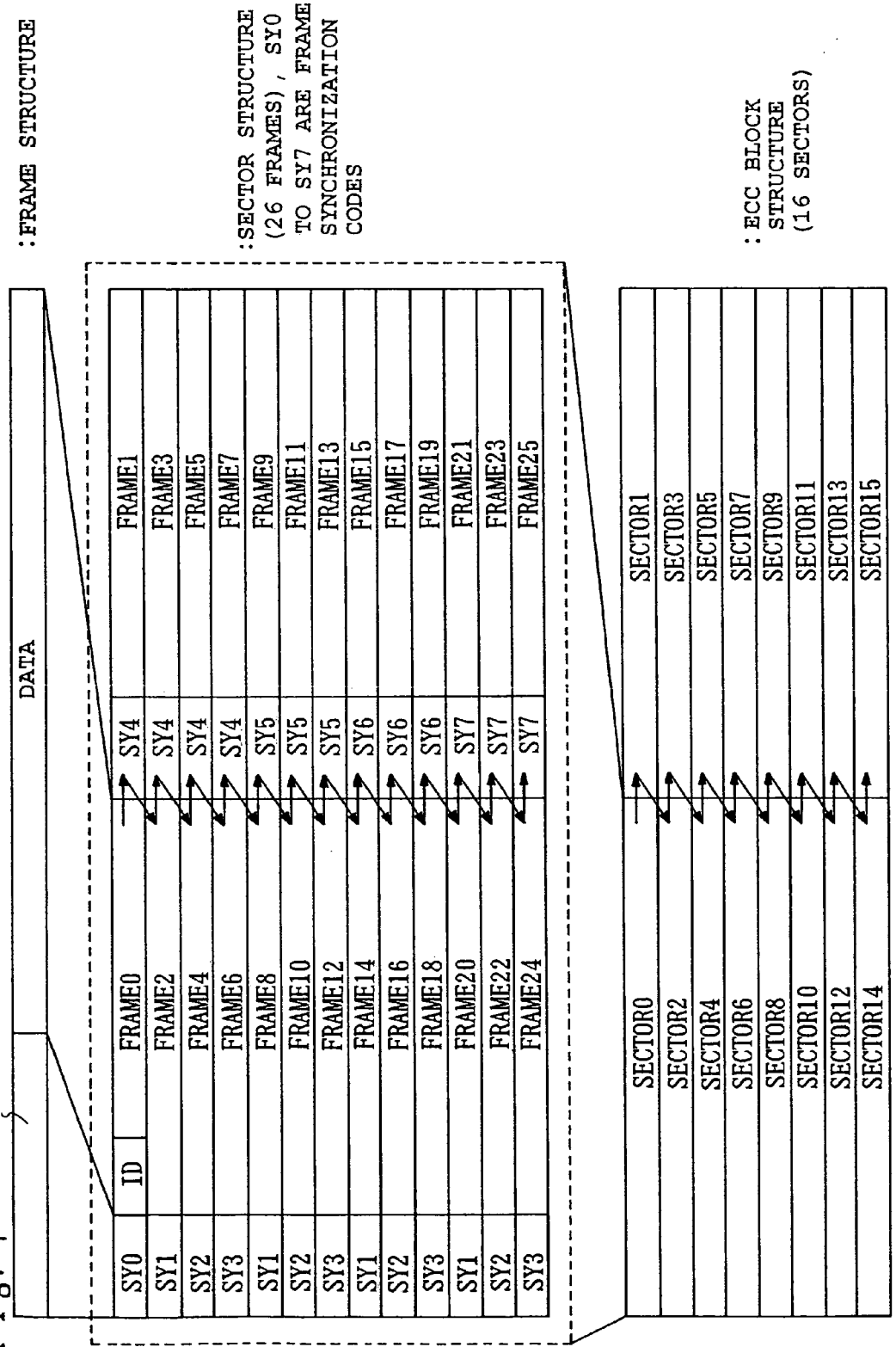
FIG. 7 shows a data structure of a DVD according to the first embodiment of the present invention.

FIG. 7 shows a data structure of the DVD 101, a constituent unit of the DVD 101 being a frame, a sector, or an ECC block. A frame is constituted by two bytes of frame synchronization and a frame synchronization code and the following 91 bytes of data. The frame synchronization code includes eight kinds of codes, that is, SY0 to SY7, arranged as shown in FIG. 7. A sector is constituted by 26 frames beginning with a frame having the code SY0. At the beginning of the frame having the code SY0, that is, at the beginning of the sector, there is a region having disk information and address information of the sector, referred to as ID, stored therein. An ECC block is constituted by 16 sectors beginning with a sector with the low order four bits of the ID being "0000b". The ID information is represented in the hexadecimal notation, and when the sector is advanced by one, the address information of the sector included in ID is advanced by one. Accordingly, the low order four bits of the ID of the leading sector of any ECC block is always "0000b".

Figure 3:
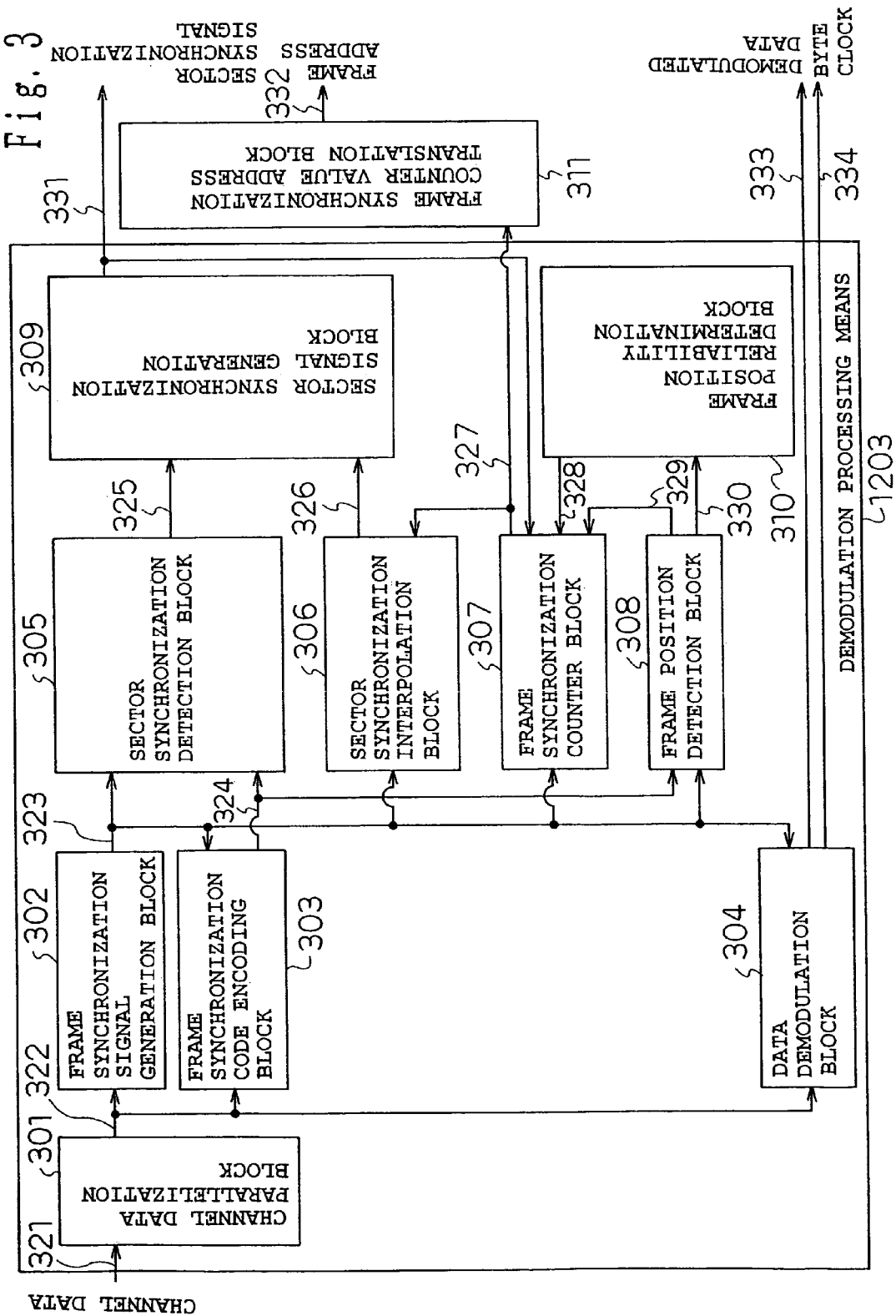
FIG. 3 is a block diagram for illustrating a frame processing and sector processing according to the first embodiment of the present invention.

The channel data input to the controller block 107 from the RF signal processing block 104 is first subject to a demodulation processing in the structure shown in FIG. 3. That is, FIG. 3 shows a structure of demodulation processing means of this embodiment. In FIG. 3, reference numeral 301 denotes a channel data parallelization block, reference numeral 302 denotes a frame synchronization signal generation block, reference numeral 303 denotes a frame synchronization code encoding block, reference numeral 304 denotes a data demodulation block, reference numeral 305 denotes a sector synchronization detection block, reference numeral 306 denotes a sector synchronization interpolation block, reference numeral 307 denotes a frame synchronization counter block, reference numeral 308 denotes a frame position detection block, reference numeral 309 denotes a sector synchronization signal generation block, reference numeral 310 denotes a frame synchronization position reliability determination block, and reference numeral 311 denotes a frame synchronization counter value address translation block.

The channel data 321 received from the RF signal processing block 104 is taken in the channel data parallelization block 301, which is a shift register, at every channel clock, and the output of the shift register is output to the frame synchronization signal generation block 302, frame synchronization code encoding block 303, and data demodulation block 304 as parallel data 322.

Upon receiving the parallel data 322, the frame synchronization signal generation block 302 detects the frame synchronization included in the parallel data 322 each time the channel data 321 is input. After detecting the frame synchronization, the frame synchronization signal generation block 302 counts pieces of the input channel data 321 with reference to the detected frame synchronization, removes a frame synchronization if the frame synchronization is detected at a point other than the vicinity of a point where the next frame synchronization is expected to be detected, interpolates a frame synchronization according to the number of pieces of the input channel data if any frame synchronization is not detected in the vicinity of a point where the next frame synchronization is expected to be detected, and outputs the detected frame synchronization or interpolated frame synchronization to the frame synchronization code encoding block 303, data demodulation block 304, sector synchronization detection block 305, sector synchronization interpolation block 306, frame synchronization counter block 307, and frame position detection block 308 as a frame synchronization signal 323.

Upon receiving the parallel data 322 and frame synchronization signal 323, the frame synchronization code encoding block 303 extracts a 14-bit frame synchronization code added to the frame synchronization from the parallel data 322 when receiving the frame synchronization signal 323, and generates a frame synchronization code signal 324 representing each of the eight frame synchronization codes SY0 to SY7 by 8 bits as shown in FIG. 8. The generated frame synchronization code signal 324 is output to the sector synchronization detection block 305 and frame position detection block 308.

Upon receiving the parallel data 322 and frame synchronization signal 323, the data demodulation block 304 generates demodulated data 333 from the parallel data 322 with reference to the frame synchronization signal 302, and generates a byte clock 334 each time the demodulated data is generated. The byte clock 334 serves as a timing of the reception of the demodulated data 333 or is used for counting the number of pieces of the demodulated data.

Upon receiving the frame synchronization signal 323 and frame synchronization code signal 324, the sector synchronization detection block 305 compares the frame synchronization code signal 324 with "00000001b" for each of the frame synchronization signal, and if they coincide with each other, it is determined that a sector synchronization is detected. When it is determined that the sector synchronization is recognized, the sector synchronization detection block 305 generates a sector synchronization signal 325 and outputs it to the sector synchronization signal generation block 309.

Upon receiving the frame synchronization signal 323 and frame synchronization code signal 324, the frame position detection block 308 outputs a frame position signal 329 indicating the ordinal position of the frame in the sector to the frame synchronization counter block 307, and if the frame position can be detected from the frame synchronization code signal 324, outputs a frame synchronization code arrangement OK signal 330 to the frame position reliability determination block 310.

The frame position reliability determination block 310 monitors the frame synchronization code arrangement OK signal 330, and if the frame position detected from the frame synchronization code arrangement OK signal 330 is determined to be reliable, outputs a frame position detection result adoption signal 328 to the frame synchronization counter block 307.

Figure 5:
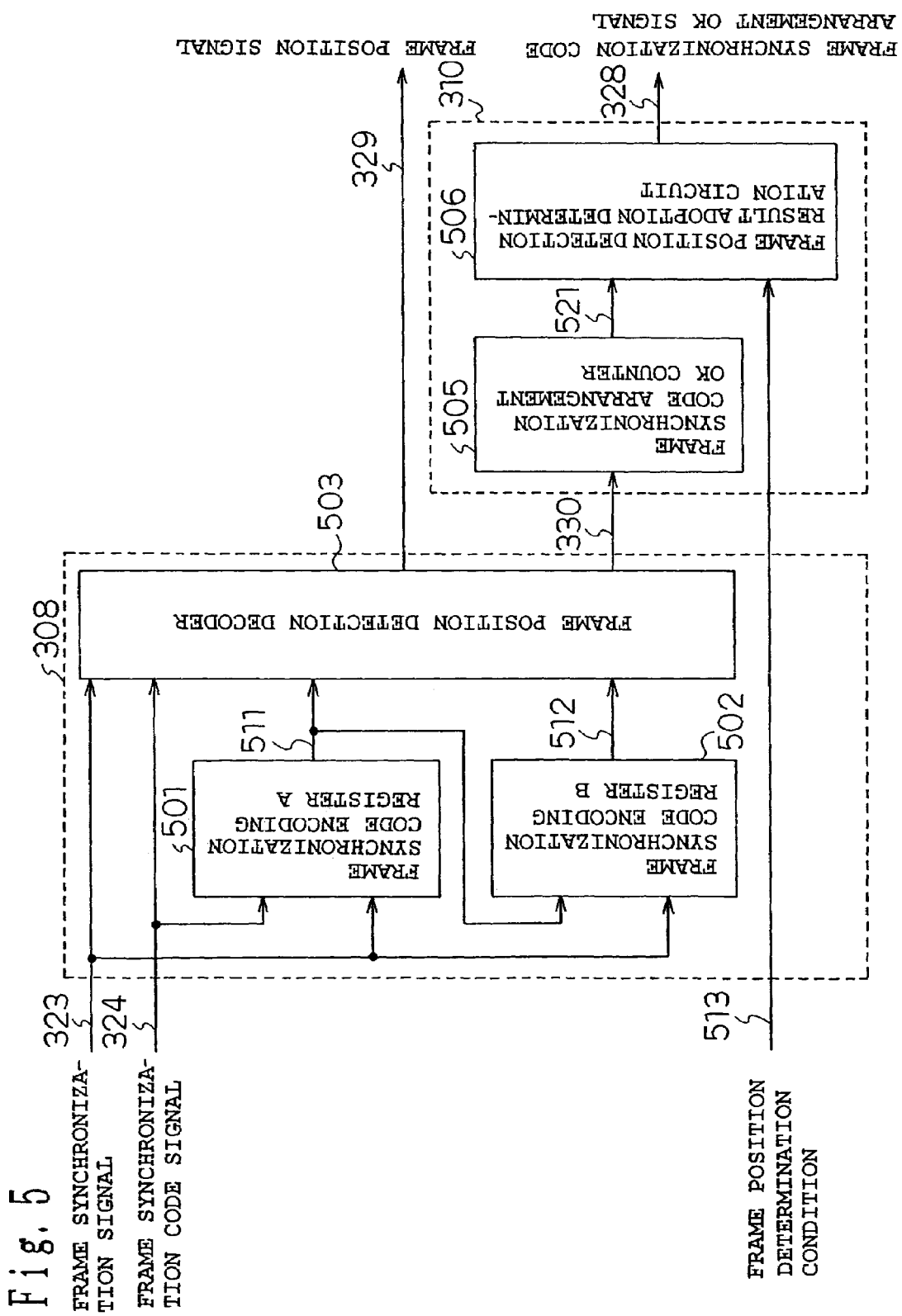
FIG. 5 is a block diagram showing a frame position detection block and frame position reliability determination block according to the first embodiment of the present invention.

Now, an operation of the frame position detection block 308 and frame position reliability determination block 310 will be described in detail with reference to FIG. 5. In FIG. 5, reference numeral 501 denotes a frame synchronization code encoding register A, reference numeral 502 denotes a frame synchronization code encoding register B, reference numeral 503 denotes a frame position detection decoder, reference numeral 505 denotes a frame synchronization code arrangement OK counter, and reference numeral 506 denotes a frame position detection result adoption determination circuit. Here, the frame position detection block 308 is constituted by the frame synchronization code encoding register A 501, frame synchronization code encoding register B 502, and frame position detection decoder 503, and the frame position reliability determination block 310 is constituted by the frame synchronization code arrangement OK counter 505 and frame position detection result adoption determination circuit 506.

Upon receiving the frame synchronization signal 323 and frame synchronization code signal 324, the frame position detection block 308 outputs a value of the frame synchronization code encoding register A 501 as a (n−1)th frame synchronization code signal 511 and a value of the frame synchronization code encoding register B 502 as a (n−2)th frame synchronization code signal 512 to the frame position detection decoder 503 for each frame synchronization signal 323.

Besides, for each frame synchronization signal 323, the value of the frame synchronization code encoding register A 501 is stored in the frame synchronization code encoding register B 502, and the frame synchronization code signal 324 is stored in the frame synchronization code encoding register A 501.

In this regard, the frame synchronization code encoding register A 501 and frame synchronization code encoding register B 502 are configured as a shift register.

The frame position decoder 503 takes in values included in the frame synchronization code 324, (n−1)th frame synchronization code signal 511, and (n−2)th frame synchronization code signal 512 for each frame synchronization signal 323. Here, the three values taken in the frame position detection decoder 503 constitute the frame synchronization codes of a current frame, frame one frame ahead of the current frame, and frame two frames ahead of the current frame.

The frame position detection decoder 503 having the values of the three frame synchronization codes taken therein checks them against the arrangement of the frame synchronization codes shown in FIG. 7, outputs the ordinal number of the frame in the sector to the frame synchronization counter block 307 as the frame position signal 329, and if there is a matched arrangement as a result of the check against the frame synchronization code arrangement, outputs the frame synchronization code arrangement OK signal 330 to the frame position reliability determination block 310.

Upon receiving the frame synchronization code arrangement OK signal 330, the frame position reliability determination block 310 monitors the frame synchronization code arrangement OK signal 330 for each frame synchronization signal 323 in the frame synchronization code arrangement OK counter 505. The frame synchronization code arrangement OK counter 505 is such a type of counter that increments the count value if there is a frame synchronization code arrangement OK signal 330, and clears the count value if there is no frame synchronization code arrangement OK signal 330, which outputs the count value as an arrangement OK count signal 521 to the frame position detection result adoption determination circuit 506.

Upon receiving the frame synchronization code arrangement OK count signal 521, the frame position detection result adoption determination circuit 506 compares a frame position determination condition 513 preset by the control microcomputer 108 with the frame synchronization code arrangement OK count signal 521, and if the frame synchronization code arrangement OK count signal 521 is larger than the frame position determination condition, outputs a frame position detection result adoption signal 328 to the frame synchronization counter block 307.

Provided that the frame position determination condition 513 is 5, for example, the frame position detection result adoption determination circuit 506 outputs the frame position detection result adoption signal 328 to the frame synchronization counter block 307 when the frame synchronization code arrangement OK count signal 521 is 6 or more.

Thus, the frame position detection result adoption signal 328 is output if the number of the continuously detected frame positions is larger than the number of times specified by the frame position determination condition 513. In other words, if the frame positions are successfully continuously detected, the frame position reliability determination block 310 determines the detected frame positions to be reliable and outputs the frame position detection result adoption signal 328, and if the frame positions are not successfully continuously detected, the frame position reliability determination block 310 determines the detected frame positions to be unreliable and does not output the frame position detection result adoption signal 328.

So far, the frame position detection block 308 and frame position reliability determination block 310 have been described in detail.

Referring to FIG. 3 again, the frame synchronization counter block 307 is such a type of counter that counts the number of frames in the sector by clearing the count value when receiving the sector synchronization signal 331 output from the sector synchronization signal generation block 309 and incrementing the count value when receiving the frame synchronization signal 323.

In addition, the frame synchronization counter block 307 has a correction function of integrating the frame position signal 329 received from the frame position detection block 308 into the counter value when the frame position detection result adoption signal 328 received from the frame position reliability determination block 310 is valid.

Therefore, even if the counter value representing the number of frames in the sector becomes inaccurate due to an abnormality occurring in the frame synchronization signal 323 or the like, the above-described correction function allows the counter value to recover to a normal value.

The count value of the frame synchronization counter block 307 is output to the sector synchronization interpolation block 306 and frame synchronization counter value address translation block 311 as an absolute frame position signal 327.

The absolute frame position signal 327 is a signal that indicates the position of a frame in a sector, which assumes one of 26 values from 0 to 25. Furthermore, the absolute frame position signal 327 is associated with the frame position in the sector in such a manner that the value 0 corresponds to the first frame, the value 1 corresponds to the second frame, and the value 25 corresponds to the 26th frame.

The sector synchronization interpolation block 306 monitors the absolute frame position signal 327 for each frame synchronization signal 323, and when the absolute frame position signal 327 indicates that the current frame is the 26th frame, determines that the next frame synchronization becomes the beginning of a sector.

Upon determining that the next frame synchronization represents the beginning of a sector, the sector synchronization interpolation block 306 generates a sector synchronization interpolation signal 326 when receiving the next frame synchronization signal 323, and outputs it to the sector synchronization signal generation block 309.

The sector synchronization signal generation block 309 generates the sector synchronization signal 331 by selecting the sector synchronization detection signal 325 and sector synchronization interpolation signal 326 according to the instruction from the control microcomputer 108, and outputs it to the frame synchronization counter block 307 and a block for controlling the ECC block synchronization described below.

That is, the sector synchronization signal generation block 309 selects the sector synchronization detection signal 325 or sector synchronization interpolation signal 326 that is more reliable to generate the sector synchronization signal 331. For example, if the sector synchronization detection signal 325 is not reliable, the sector synchronization interpolation signal 326 is selected. Accordingly, since the sector synchronization interpolation signal 326 is selected if any omission or error occurs in detection of the sector synchronization detection signal 325 in the sector synchronization detection block 305, a reliable sector synchronization signal 331 can be output.

The frame synchronization counter value address translation block 331 decodes the absolute frame position signal 327 and generates a frame address 332 that is a base address of the buffer memory for storing the frame.

Figure 4:
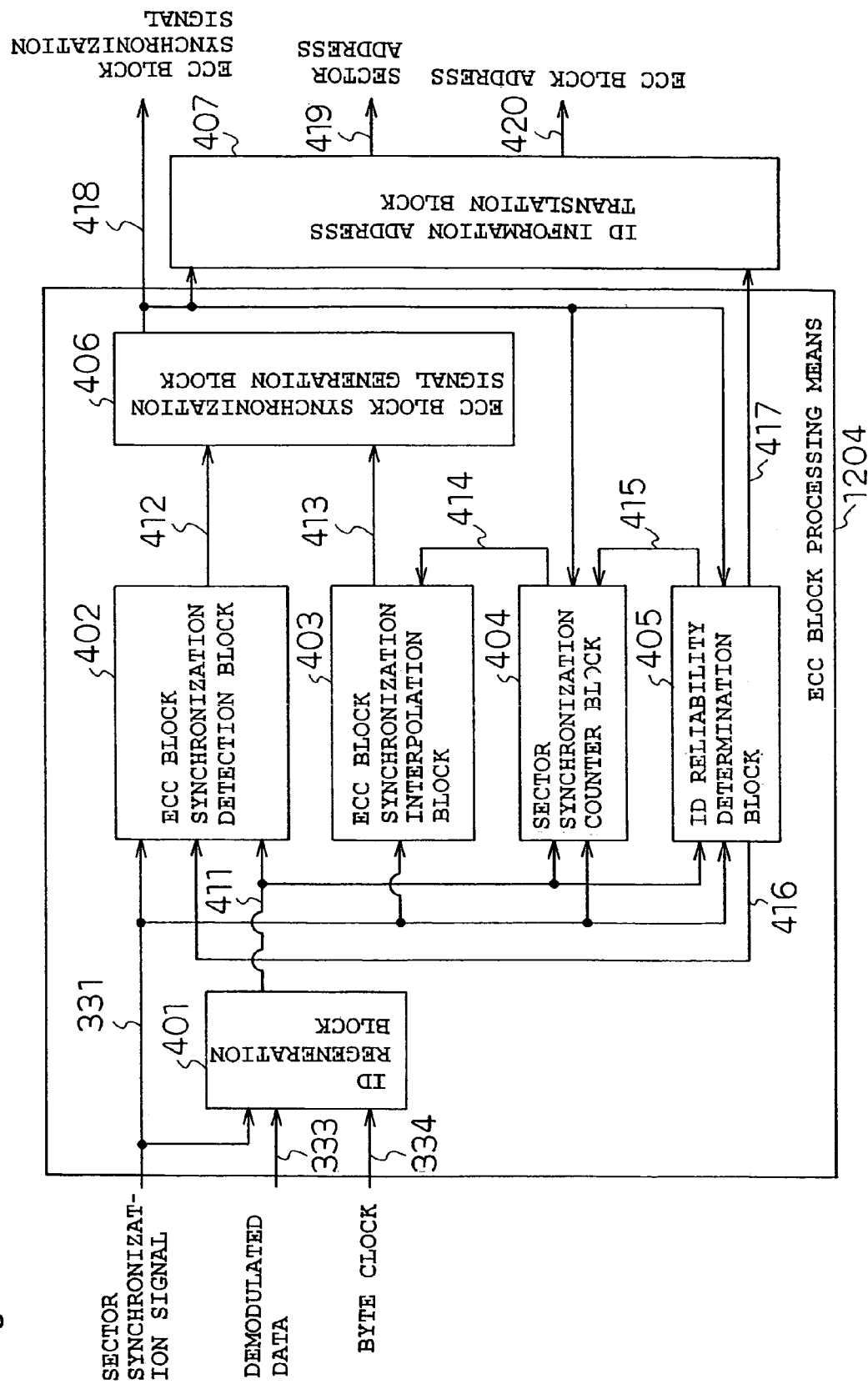
FIG. 4 is a block diagram for illustrating an ECC block processing according to the first embodiment of the present invention.

Next, an ECC block synchronization processing following the above-described frame synchronization processing and sector synchronization processing will be described with reference to FIG. 4. That is, FIG. 4 shows a structure of ECC block processing means 1204 of this embodiment. In FIG. 4, reference numeral 401 denotes an ID regeneration block, reference numeral 402 denotes an ECC block synchronization detection block, reference numeral 403 denotes an ECC block synchronization interpolation block, reference numeral 404 denotes a sector synchronization counter block, reference numeral 405 denotes an ID reliability determination block, reference numeral 406 denotes an ECC block synchronization signal generation block, and reference numeral 407 denotes an ID information address translation block.

First, the ID regeneration block 401 receives the demodulated data 333 and byte clock 334 from the data demodulation block 304, and the sector synchronization signal 331 from the sector synchronization signal generation block 309, and immediately after receiving the sector synchronization signal 331, acquires 4-byte ID information and a 2-byte EDC parity of the ID information from the demodulated data 333 at the timing of the byte clock 334. Upon receiving the ID information and EDC parity of the ID information, the ID regeneration block 401 performs error detection on the acquired ID information and outputs 24 bits of the address component of the ID information and 1 bit of the error detection result component of the ID information as an ID acquisition signal 411 to the ECC block synchronization detection block 402, sector synchronization counter block 404, and ID reliability determination block 405.

The ECC block synchronization detection block 402 receives the ID acquisition signal 411 for each sector synchronization signal 331, and if the error detection result component of the ID information of the ID acquisition signal 411 indicates that the acquired ID information is correct, compares the low order four bits of the address component of the ID information of the ID acquisition signal 411 with "0000b". If the comparison results in a match, or a high order address determination result signal 416 described later that is generated in the ID reliability determination block 405 is input thereto, the ECC block synchronization detection block 402 generates an ECC block synchronization detection signal 412 and outputs it to the ECC block synchronization signal generation block 406.

Upon receiving the sector synchronization signal 331, ID acquisition signal 411, and ECC block synchronization signal 418 described later, the ID reliability determination block 405 determines whether the ID acquisition signal 411 is reliable or not, and outputs an address reliability OK signal 415 to the sector synchronization counter block 404 if the ID acquisition signal 411 is determined to be reliable. In addition, if the ID reliability determination block 405 detects a change of the ECC block, it outputs the high order address determination result signal 416 to the ECC block synchronization detection block. Furthermore, the ID reliability determination block 405 improves the reliability of the ID acquisition signal 411 and outputs it as an ID information signal 417 to the ID information address translation block 407.

Figure 6:
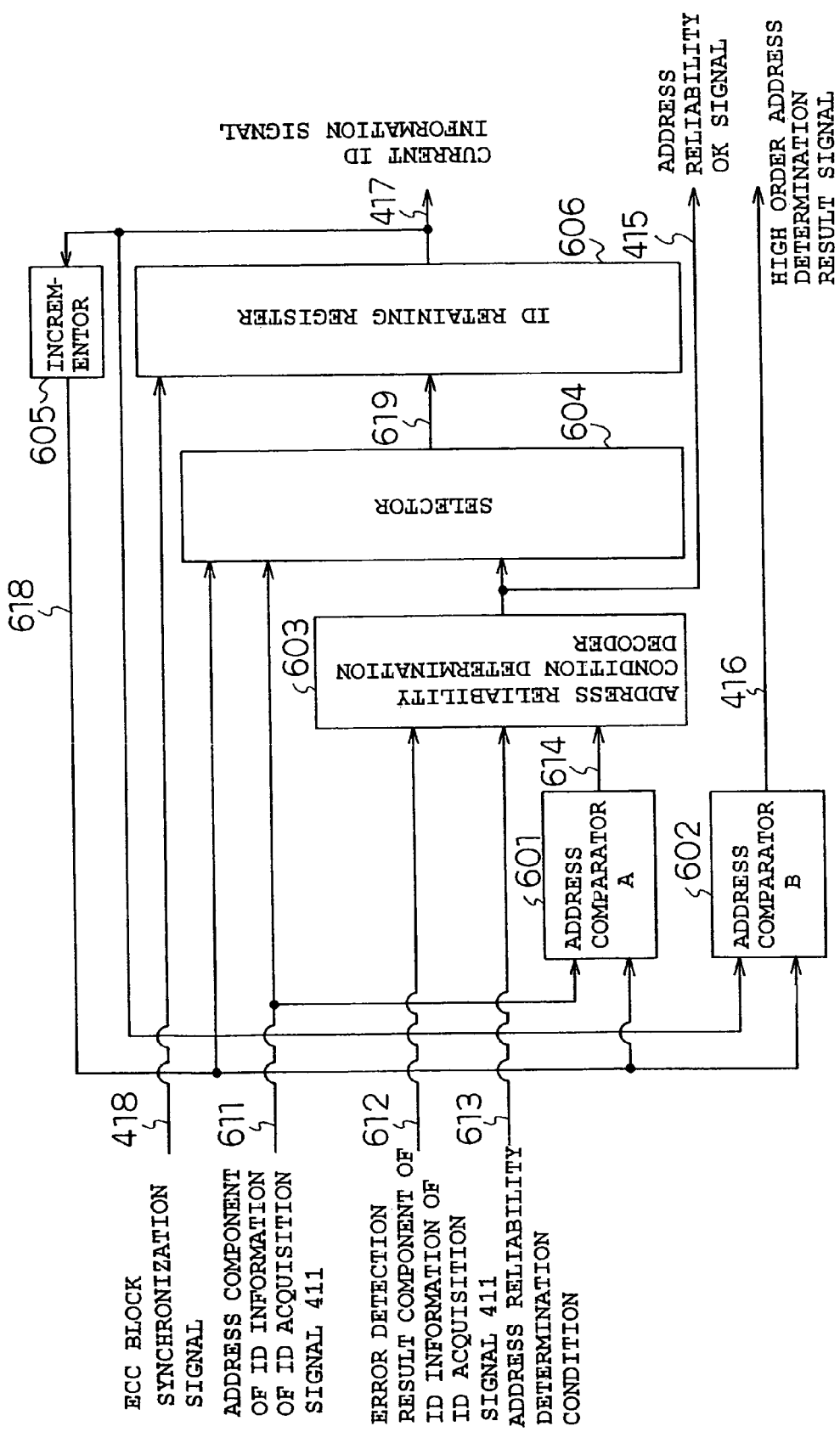
FIG. 6 is a block diagram for illustrating an ID reliability determination block according to the first embodiment of the present invention.

Now, an operation of the ID reliability determination block 405 will be described with reference to FIG. 6. In FIG. 6, reference numeral 601 denotes an address comparator A, reference numeral 602 denotes an address comparator B, reference numeral 603 denotes an address reliability condition determination decoder, reference numeral 604 denotes a selector, reference numeral 605 denotes an incrementer, and reference numeral 606 denotes an ID retaining register.

If an error detection result component 612 of the ID information of the ID acquisition signal 411 indicates that the acquired ID is correct, upon receiving the ID acquisition signal 411, the ID reliability determination block 405 compares an address component 611 of the ID information of the ID acquisition signal 411 with an address expected value signal 618 described later in the address comparator A 601 to determine the continuity of address. Since the address expected value signal 618 indicates the ID acquisition signal 411 to be input subsequently, coincidence between the two signals indicates the continuity of address. The address continuity determination result is output as an address continuity determination signal 614 to the address reliability condition determination decoder 603.

The address comparator B 602 compares the high order 20 bits of the address component 611 of the ID information of the ID acquisition signal 411 with the high order 20 bits of the address component of a current ID information signal 417 described later, and outputs a high order address determination result signal 416 to the ECC block synchronization determination block 402 if the comparison does not result in a match. Here, the address component 611 of the ID information of the ID acquisition signal 411 and address component of the current ID information signal 417 described later are two continuous addresses at the timing of the sector synchronization signal 331. In addition, the ECC block of the DVD 101 is constituted by 16 sectors each beginning with the low order four bits of the address represented in the hexadecimal notation included in the ID information of "0000b". Therefore, the high order address determination result signal 416 can be considered to indicate the comparison result of quotients of "(read sector address information)/(number of sectors constituting the ECC block)" of the two continuous sectors, and indicate the change of the ECC block.

The address reliability condition determination decoder 603, according to the address reliability determination condition 613 preset by the control microcomputer 108, decodes the error detection result component 612 of the ID information of the ID acquisition signal 411 and the address continuity determination signal 614, and generates the address reliability OK signal 415 if the address reliability determination condition 613 is satisfied. The address reliability OK signal 415 is output to the selector 604 and sector synchronization counter block 404.

The selector 604 selects the ID acquisition signal 411 if the address reliability OK signal 415 indicates that the ID acquisition signal 411 is reliable, or selects the address expected value signal 618 described later if the address reliability OK signal 415 indicates that the ID acquisition signal 411 is not reliable, and outputs the selected address information as a current address selection signal 619 to the ID retaining register 606.

The ID retaining register 606 stores the current address selection signal 619 for each sector synchronization signal 331, and outputs the stored value as the current ID information signal 417 to the incrementer 605 and ID information address translation block 407.

The incrementer 605 is a circuit that adds 1 to the value of the current ID information signal 417, and outputs the addition result as the address expected value signal 618 to the selector 604 and address comparator A 601. The reason why the addition result becomes the address expected value signal 616 is that the address component included in the ID information of the DVD 101 has a rule that when the sector is advanced by one, the address component is also advanced by one.

So far, the operation of the ID reliability determination block 405 has been described in detail.

Referring to FIG. 4 again, upon receiving the sector synchronization signal 331, ID information acquisition signal 411, address reliability OK signal 415, and ECC block synchronization signal 418 described later, the sector synchronization counter block 404 operates at each sector synchronization signal 331 to take in the low order four bits of the address component of the ID acquisition signal 411 as the counter value if the address reliability OK signal 415 indicates that the ID acquisition signal 411 is reliable, or increments the counter value if the address reliability OK signal 415 indicates that the ID acquisition signal 411 is not reliable, and is cleared by the ECC block synchronization signal 418. Therefore, if the ID information is determined to be reliable, the sector synchronization counter block 404 has its counter value corrected by the ID information. The counter value is output as an absolute sector address signal 414 to the ECC block synchronization interpolation block 403.

The ECC block synchronization interpolation block 403 monitors the absolute sector address signal 414 for each sector synchronization signal 331, and generates the ECC block synchronization interpolation signal 413 at the timing of the sector synchronization signal 331 when the absolute sector address signal 414 indicates 15, that is, the last sector in the ECC block.

The ECC block synchronization signal generation block 406 selects the ECC block synchronization detection signal 412 and ECC block synchronization interpolation signal 413 according to the condition preset by the control microcomputer, and generates the ECC block synchronization signal 418. The ECC block synchronization signal 418 is output to the sector synchronization counter block 404 and ID information address translation block 407.

The ID information address translation block 407 takes in the current ID information signal 417 at each ECC block synchronization signal 418 and generates a sector address 419 and ECC block address 420 that are the base addresses of the buffer memories storing the sector and ECC block, respectively. Here, the sector address 419 must be set to include 26 or more regions for storing the frames, and the ECC block address 420 must be set to include 16 or more regions for storing the sectors.

Figure 2:
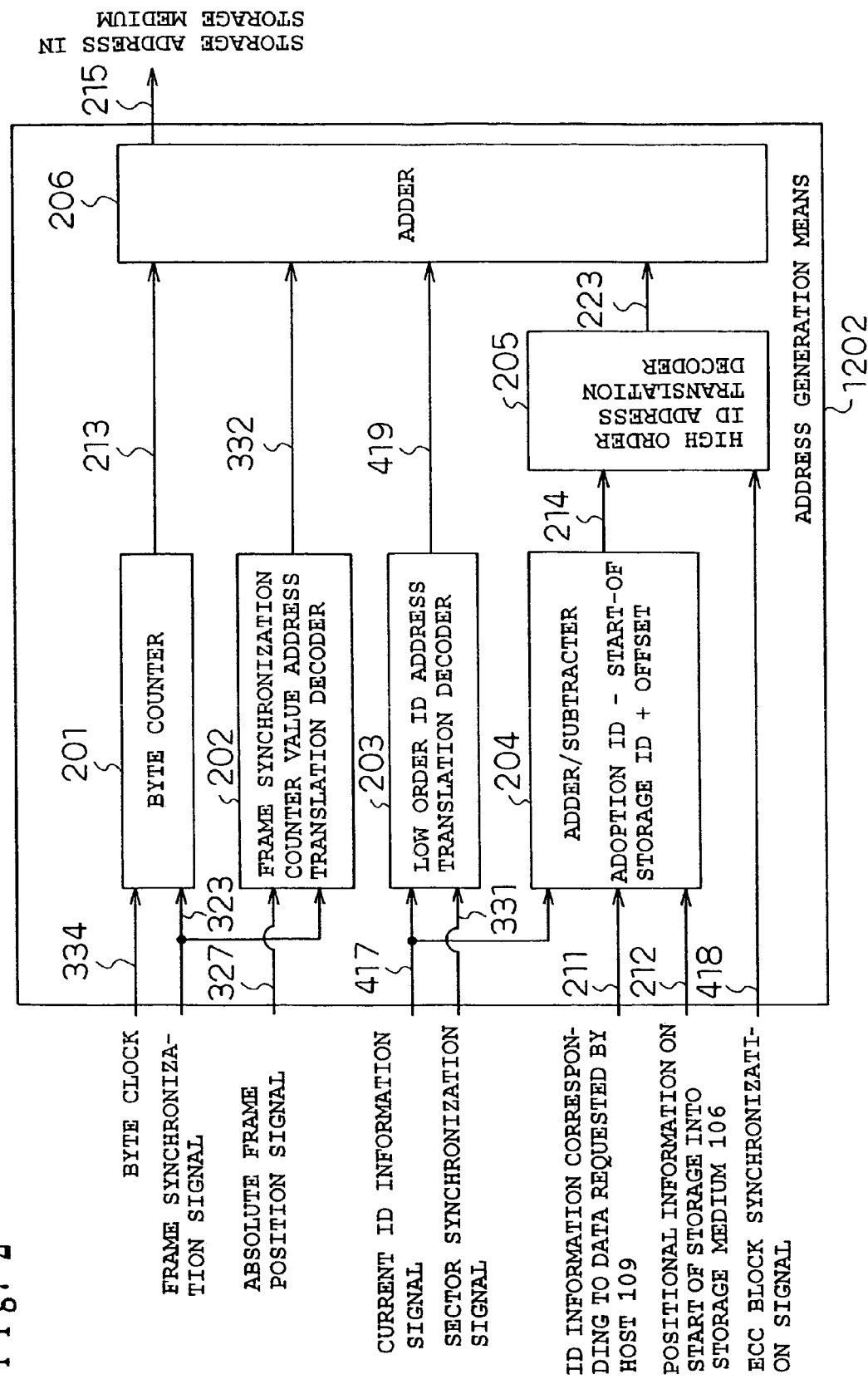
FIG. 2 is a block diagram for illustrating generation of a data storage address in a buffer memory according to the first embodiment of the present invention.

Lastly, an eventual generation of a data storage address in the buffer memory 106 will be described with reference to FIG. 2. FIG. 2 shows a structure of address generation means 1202 of this embodiment. In FIG. 2, reference numeral 201 denotes a byte counter, reference numeral 202 denotes a frame synchronization counter value address translation decoder, reference numeral 203 denotes a low order ID address translation decoder, reference numeral 204 denotes an adder/subtracter, reference numeral 205 denotes a high order ID address translation decoder, and reference numeral 206 denotes an adder. In this regard, the frame synchronization counter value address translation block 311 in FIG. 3 is equivalent to the frame synchronization counter value address translation decoder 202 in FIG. 2, and the ID information address translation block 407 in FIG. 4 is constituted by the low order ID address translation decoder 203, adder/subtracter 204, and high order ID address translation decoder 205.

The byte counter 201 is a counter that is cleared by the frame synchronization signal 323 and counts the byte clock 334. That is, the byte counter 201 is cleared at the beginning of a frame and counts the number of the demodulated pieces of data, and the counter value thereof becomes the address of the buffer memory 106 for storing the 91 bytes in the frame as it is. The counter value of the byte counter 201 is output as an in-frame address 213 to the adder 205.

The frame synchronization counter value address translation decoder 202 is a decoder that takes in the absolute frame position signal 327 at the frame synchronization signal 323 and provides an output shown in FIG. 9(a) with respect to the input of the absolute frame position signal 327, and the decoding result is output as the frame address 332 to the adder 206.

The low order ID address translation decoder 203 is a decoder that takes in the low order four bits of the current ID information signal 417 at the sector synchronization signal 331 and provides an output shown in FIG. 9(b) with respect to the input of the low order four bits of the current ID information signal 417, and the decoding result is output as the sector address 419 to the adder 206.

The adder/subtracter 204 subtracts the high order 20 bits of the ID information 221 corresponding to the data that is preset by the control microcomputer 108 and requested from the host 109 from the high order 20 bits of the current ID information signal 417. In this process, the respective low order four bits thereof are rounded down. Positional information 212 on a start of storage into the buffer memory 106 is added to the calculation result, and the result thereof is output as ECC block position information 214 to the high order ID address translation decoder 205.

The high order ID address translation decoder 204 is a decoder that takes in the ECC block position information 214 for each ECC block synchronization signal 418 and provides an output shown in FIG. 9(c) when the remainder of the division (ECC block position information 214)/ (number of the ECC blocks capable of being stored in the buffer memory 106) is input thereto as the absolute ECC block address, and the decoding result is output as an ECC block address 223 to the adder 205. Here, in the example shown in FIG. 9(c), the number of the ECC blocks capable of being stored in the buffer memory 106 is 4.

The adder 205 is an adder that adds the in-frame address 213, frame address 332, sector address 419, and ECC block address 420 together, and the result of the addition becomes a buffer memory storage address 215.

With such a configuration, in the case where the frame synchronization cannot be detected or is detected excessively, when the frame synchronization begins to be normally detected, the frame position detection block 308 detects a frame position, and the frame position reliability determination block 310 determines whether the detected frame position is reliable or not. Accordingly, a highly accurate frame synchronization position can be loaded into the frame synchronization counter block 307, and an absolute frame position in a sector stored in the buffer memory 106 can be properly corrected by the frame synchronization counter value address translation decoder 202.

In addition, in the case where the sector synchronization cannot be detected or is detected excessively, when the sector synchronization begins to be normally detected, highly reliable ID information can be acquired in the ID reliability determination block 405, and an absolute sector position in an ECC block stored in the buffer memory 106 and an absolute ECC block position in the buffer memory 106 can be properly corrected by inputting the ID information into the low order ID address translation decoder 203 and high order ID address translation decoder 204.

Furthermore, in replay of a disk having data written thereon according to a defect sector management method for a DVD-RAM of skipping only a defective sector as shown in FIG. 10(a) or a disk having data written thereon according to a defect sector management method for a DVD-RAM of skipping an ECC block including a defective sector as shown in FIG. 10(b), even if positional information of a defective sector is not provided so that data of the defective sector is stored in the buffer memory 106, the addresses of the ID information before and after the defective sector are consecutive and a highly reliable ID information can be acquired in the ID reliability determination block 405, and therefore, the region of the buffer memory 106 storing the data of the defective sector can be overwritten with correct data so that the disk including the defective sector can be replayed without the defective sector being noticed.

As described above, even if the data read from the DVD 101 cannot be stored in the buffer memory 106, the address of the data storage into the buffer memory 106 is corrected to be normal by detecting an absolute position of the data in each of the data structures by means of the frame position detection block 308, frame position reliability determination block 310, and ID reliability determination block 405, and translating it into an address by means of the frame synchronization counter value address translation decoder 202, low order ID address translation decoder 203, and high order ID address translation decoder 205, and accordingly, an optical disk drive with an enhanced replaying capability can be constructed.

(Second Embodiment)

Figure 11:
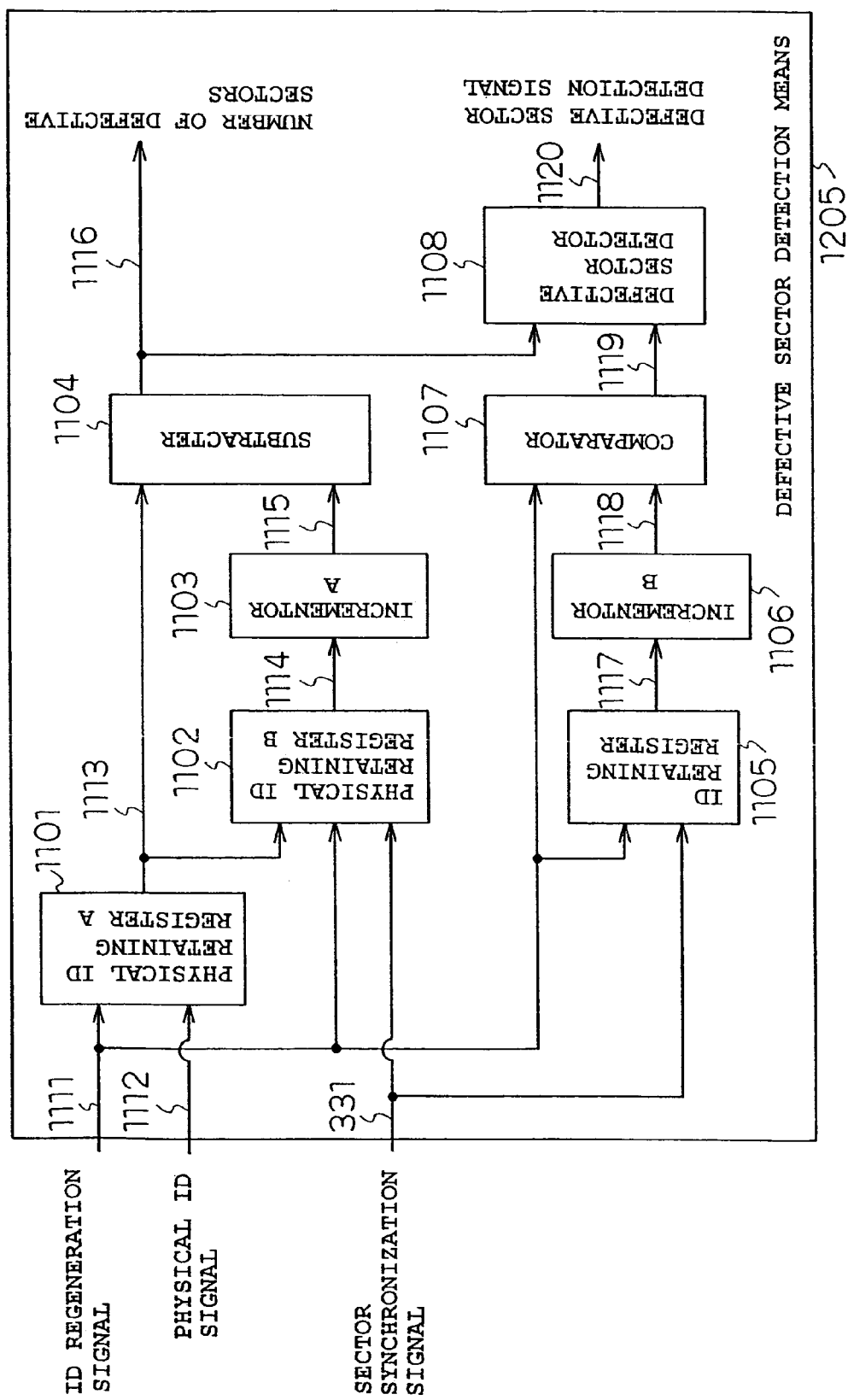
FIG. 11 is a block diagram showing defective sector detection means according to the second embodiment of the present invention.

Next, a second embodiment will be described with reference to FIG. 11. FIG. 11 shows a structure of defective sector detection means 1205 of this embodiment. The same components as those in the previous embodiment are given the same reference numerals, and description thereof is omitted.

In FIG. 11, reference numeral 1101 denotes a physical ID retaining register A, reference numeral 1102 denotes a physical ID retaining register B, reference numeral 1103 denotes an incrementer A, reference numeral 1104 denotes a subtracter, reference numeral 1105 denotes an ID retaining register, reference numeral 1106 denotes an incrementer B, reference numeral 1107 denotes a comparator, and reference numeral 1108 denotes a defective sector detector.

The physical ID retaining register A 1101 monitors an error detection component of the ID information of an ID regeneration signal 1111 for each physical ID signal 1112, and if it is indicated that the acquired physical ID is free of error, takes in an address component of the ID information of the ID regeneration signal 1111, and outputs it as a physical ID acquisition signal 1113 to the physical ID retaining register B 1102 and subtracter 1104. Here, the physical ID signal 1112 becomes capable of being generated by configuring the frame synchronization generation signal block 302 so as to detect not only the frame synchronization but also an AM that is a synchronization of the physical ID, and supplying the physical ID signal 1112 to the data demodulation block 304 allows the physical ID to be generated in the ID regeneration block 401. Therefore, the ID regeneration signal 1111 is equivalent to the output of the ID regeneration block 401. In this regard, the AM is described in the DVD-RAM format and is followed by the description of the physical ID.

The physical ID retaining register B 1102 and ID retaining register 1105 monitor the error detection component of the ID information of the ID regeneration signal 1111 for each sector synchronization signal 331. If it is indicated that the acquired ID is free of error, the physical ID retaining register B 1102 takes in the physical ID retaining register A 1101 and outputs it as a physical ID signal 1114 to the incrementer A 1103, and the ID retaining register 1105 takes in the address component of the ID information of the ID regeneration signal 1111 and outputs it as an ID signal 1117 to the incrementer B 1106.

That is, even if the sector synchronization signal 331 is input, when it is indicated that the ID acquired by the ID regeneration signal 1111 has an error, the physical ID retaining register A 1101 is not taken in the physical ID retaining register B 1102, and the physical ID signal 1114 is not output to the incrementer A 1103. Furthermore, the address component of the ID information of the ID regeneration signal 1111 is not taken in the ID retaining register 1105, and the ID signal 1117 is not output to the incrementer B 1106.

As a result, the physical ID retaining register B 1102 stores therein only the physical ID that is reliably free of error, and only the physical ID signal 1114 of the physical ID that is reliably free of error is output to the incrementer A 1103. In addition, the ID retaining register 1105 stores therein only the address component of the ID information that is reliably free of error, and only the ID signal 1117 that is reliably free of error is output to the incrementer B 1106.

The incrementer A 1103 increments the physical ID signal 1114 by 1, and outputs the result as a physical ID expected value signal 1115 to the subtracter 1104.

The incrementer B 1106 increments the ID signal 1117 by 1, and outputs the result as an ID expected value signal 1118 to the comparator 1107.

The subtracter 1104 subtracts the physical ID expected value 1115 from the physical ID acquisition signal 1113 to generate the number of defective sectors 1116. The number of defective sectors 1116 is output to the defective sector detector 1108.

If the error detection component of the ID information of the ID information signal 1111 indicates that the acquired ID information is correct, the comparator 1107 compares the address component of the ID information of the ID information signal 1111 with the ID expected value signal 1118, and if there is a match between the two signals, outputs an ID continuity signal 1119 to the defective sector detector.

In the case where the defective sector detector 1108 receives the ID continuity signal 1119 and the number of defective sectors 1116 is not zero, the defective sector detector determines that a defective sector is detected and outputs a defective sector detection signal 1120. If the defective sector detection signal 1120 is output, the value indicated by the number of defective sectors 1116 becomes valid. In addition, the physical ID expected signal 1115 indicates the beginning of the defective sector.

That is, if the address components of the reliable two pieces of ID information are continuous and the two physical IDs are not continuous, there is a defective sector between the sectors associated with the above-described two pieces of ID information. In this way, the defective sector detector 1108 detects a defective sector.

With such a configuration, in replay of a disk having data written thereon according to a defect sector management method for a DVD-RAM of skipping only a defective sector as shown in FIG. 10(*a*) or a disk having data written thereon according to a defect sector management method for a DVD-RAM of skipping an ECC block including a defective sector as shown in FIG. 10(*b*), the presence of a defective sector, the start address of the defective sector, and the number of defective sectors can be detected when the condition that the subtracter 1104 does not exhibit zero is satisfied and the comparator 1107 indicates the continuity of the ID information.

In this way, since the presence of a defective sector, the start address of the defective sector, and the number of defective sectors can be detected when the condition that the subtracter 1104 does not exhibit zero is satisfied and the comparator 1107 indicates the continuity of the ID information, it is possible to construct an optical disk drive capable of carrying out not only a passive operation in which a defective sector processing is performed in response to the defective sector information from the control microcomputer 108, but also an active defective sector processing in which the optical disk drive detects a defective sector and gives to the control microcomputer 108 an instruction.

As described above, according to this embodiment, since the information of the replay data of the optical disk is analyzed, and the translation into the absolute address in the buffer memory is carried out according to the information acquired by the analysis, the replay data of the optical disk can be stored into a proper region in the buffer memory, and since the presence of the information acquired by the analysis, number of defective sectors, and address of the defective sector can be detected, the active defective sector processing can be performed.

Consequently, in data replay of an optical disk with a scratch, fingerprint or the like, the replay data can be stored into the buffer memory more accurately than before, and in replay of an optical disk with a defective sector, the burden of the defective sector management processing placed on the control microcomputer can be reduced compared to the prior art.

Thus, it is possible to provide an excellent optical disk drive that can accurately store the data of the optical disk with a scratch, fingerprint, or defective sector into the buffer memory, and reduce the burden of the defective sector management processing placed on the control microcomputer.

Here, the address generation means 1202, demodulation processing means 1203, and ECC block processing means 1204 constituting the controller block 118 of this embodiment are an example of the buffer memory address translation device of the present invention, the ECC block processing means 1204 of this embodiment is an example of the sector address reliability determination device of the present invention, the defective sector detection means 1205 of this embodiment is an example of the defective sector determination device of the present invention, the ECC block processing means 1204 of this embodiment is an example of the ECC block synchronization detection device of the present invention. Furthermore, the demodulation processing means 1203 and ECC block processing means 1204 of this embodiment are an example of the analysis means of the present invention, and the address generation means 1202 of this embodiment is an example of the address generation means of the present invention.

In addition, the ID regeneration block 401 of this embodiment is an example of the sector address information readout means of the present invention, the ECC block synchronization interpolation block 403 and sector synchronization counter block 404 of this embodiment are an example of the sector address interpolation means of the present invention, the ID reliability determination block 405 of this embodiment is an example of the sector address information reliability determination means of the present invention, the address reliability determination condition 613 of this embodiment is an example of the predetermined criterion of the present invention, and the ID information of this embodiment is an example of the sector address information of the present invention.

In addition, the frame synchronization code encoding block 303 of this embodiment is an example of the frame synchronization code readout means of the present invention, the frame synchronization code encoding register A 501 and frame synchronization code encoding register B 502 of this embodiment are an example of the storage means of the present invention, the frame position detection decoder 503 of this embodiment is an example of the continuity determination means of the present invention, the frame synchronization code arrangement OK counter 505 of this embodiment is an example of the counter means of the present invention, the frame position detection result adoption determination circuit 506 of this embodiment is an example of the frame position determination means of the present invention, the frame position determination condition 513 of this embodiment is an example of the predetermined condition of the present invention, the frame synchronization counter block 307 of this embodiment is an example of the frame position interpolation means of the present invention, and the frame synchronization counter value address translation block 332 of this embodiment is an example of the address generation means of the present invention.

In addition, the ID regeneration block 401 of this embodiment is an example of the error detection means of the present invention, the address comparator 614 of this embodiment is an example of the sector address continuity determination means of the present invention, the address reliability determination condition 613 of this embodiment is an example of the predetermined set condition of the present invention, the address reliability condition determination decoder 603 of this embodiment is an example of the reliability determination means of the present invention.

In addition, the physical ID retaining register A 1101, physical ID retaining register B 1102, incrementer 1103, subtracter 1104, ID retaining register 1105, incrementer B 1106 of this embodiment are an example of the continuity detection means of the present invention, the defective sector detector 1108 of this embodiment is an example of the defective sector detection means of the present invention, the subtracter 1104, defective sector detector 1120 of this embodiment are an example of the informing means of the present invention, the physical ID information of this embodiment is an example of the sector physical address information of the present invention, the ID signal of this embodiment is an example of the sector logical address information of the present invention, the physical ID retaining register A 1101 of this embodiment is an example of the sector physical address information readout means of the present invention, the physical ID retaining register B 1102 of this embodiment is an example of the sector physical address information error detection means of the present invention, the incrementer A 1103 and subtracter 1104 of this embodiment are an example of the sector physical address information comparison means of the present invention, the ID retaining register 1105 of this embodiment is an example of the sector logical address information readout means of the present invention, the ID retaining register 1105 of this embodiment is an example of the sector logical address information error detection means of the present invention, and the incrementer B 1106 and comparator 1107 of this embodiment are an example of the sector logical address information comparison means of the present invention.

In addition, the ID regeneration block 401 of this embodiment is an example of the error detection means of the present invention, the address comparator B 602 of this embodiment is an example of the sector address division means of the present invention, and the address reliability condition determination decoder 603, selector 604, ID retaining register 417, and address comparator B 602 of this embodiment are an example of the ECC block detection means of the present invention.

The present invention is a program for making a computer implement functions of all or part of means (or device, element, circuit, section and the like) of the above-described buffer memory address translation device, sector address information reliability determination device, defective sector determination device, or ECC block synchronization detection device of the present invention.

The present invention is a medium that stores the program for making a computer implement all or part of the functions of all or part of means (or device, element, circuit, section and the like) of the above-described buffer memory address translation device, sector address information reliability determination device, defective sector determination device, or ECC block synchronization detection device of the present invention, the medium being computer-readable, and the read-out program cooperating with the computer to implement the functions.

Here, the "part of means (or device, element, circuit, section and the like)" of the present invention refer to some of a plurality of those means or part of the functions of one means, and the "part of steps (or process, operation, action and the like)" of the present invention refer to some of a plurality of those steps or part of the operations in one step.

In addition, a computer-readable recording medium having the program of the present invention recorded therein is also included in the present invention.

In addition, the program of the present invention may be used in such a manner that it is recorded in a computer-readable recording medium and cooperates with a computer.

In addition, the program of the present invention may be used in such a manner that it is transmitted through a transmission medium and read by a computer to cooperate with the computer.

In addition, the recording medium includes ROM, the transmission medium includes the Internet, light, radio wave, and acoustic wave.

In addition, the above-described computer of the present invention is not limited strictly to hardware such as a CPU and may be firmware or OS and includes peripheral devices.

Furthermore, as described above, the present invention may be configured in the form of software or hardware.

Industrial Applicability

As apparently seen from the above description, according to the present invention, it is possible to provide a buffer memory address translation device, a sector address information reliability determination device, a defective sector determination device, an ECC block synchronization detection device, an optical disk drive, a medium, and a program in which even if an abnormality occurs in a synchronization detection and interpolation signal due to a factors such as a fingerprint or scratch, correspondence between pieces of data stored in a buffer memory is not lost.

Furthermore, according to the present invention, it is possible to provide a buffer memory address translation device, a sector address information reliability determination device, a defective sector determination device, an ECC block synchronization detection device, an optical disk drive, a medium, and a program in which data can be read from an optical disk medium without the need for acquiring defective sector information from the optical disk medium.

The invention claimed is:

1. In readout from a rewritable optical disk medium storing sector physical address information that is a physical address of a sector besides sector logical address information included in data, a defective sector determination device, characterized in that the defective sector determination device comprises:

continuity detection means of detecting a position where a difference occurs between the continuity of said sector physical address information and the continuity of said sector logical address information;

defective sector detection means of finding a defective sector using said detected difference; and informing means of informing an external control means of said detected defective sector.

2. The defective sector determination device according to claim 1, characterized in that said defective sector detection means detects the number of said defective sectors and the sector physical address information of a leading one of said defective sectors, and said informing means informs of said number of defective sectors and said sector physical address information of a leading one of said defective sectors.

3. The defective sector determination device according to claim 1, characterized in that said continuity determination means comprises:

sector physical address information readout means of reading said sector physical address information;

sector physical address information error detection means of detecting an error of said read sector physical address information; and sector physical address information comparison means of comparing, of the sector physical address information for which an error is not detected by said sector physical address information error detection means, current sector physical address information with the previous sector physical address information, and said continuity determination means of, if said sector physical address information error detection means detects no error in said read sector physical address information, determining the continuity between said read sector physical address information and said previous sector physical address information based on the result of said comparison.

4. The defective sector determination device according to claim 1, characterized in that said continuity determination means comprises:

sector logical address information readout means of reading said sector logical address information;

sector logical address information error detection means of detecting an error of said read sector logical address information; and sector logical address information comparison means of comparing, of the sector logical address information for which an error is not detected by said sector logical address information error detection means, current sector logical address information with the previous sector logical address information, and said continuity determination means of, if said sector logical address information error detection means detects no error in said read sector logical address information, determining the continuity between said read sector logical address information and said previous sector logical address information based on the result of said comparison.

5. The defective sector determination device according to claim 1, characterized in that said position where a difference occurs is a position where there are one or more sectors for which the sector physical address information is determined to be continuous between two continuous sectors corresponding to the sector address information for which said sector address information is determined to be continuous.

6. The defective sector determination device according to claim 2, characterized in that said defective sector detection means regards the sector physical address information of the sector for which said sector logical address information is not continuous as the sector physical address information of said leading one of the defective sectors.

7. The defective sector determination device according to claim 2, characterized in that said defective sector detection means detects the number of sectors for which said sector physical address information is determined to be continuous and that exist between the two sectors corresponding to the sector logical address information determined to be continuous, and regards said number of detected sectors as said number of defective sectors.

8. An optical disk drive, characterized in that the optical disk drive comprises:

data readout means of reading data from an optical disk medium; and a controller that, in response to a request from an external device, controls said data readout means to temporarily store said read data into a buffer memory and then transfers the same to said external device, and said controller has the defective sector determination device according to claim 1 implemented therein.

* * * * *